(12) United States Patent
Hegna et al.

(10) Patent No.: US 11,994,640 B2
(45) Date of Patent: May 28, 2024

(54) ATTENUATION OF LOW-FREQUENCY NOISE IN CONTINUOUSLY RECORDED WAVEFIELDS

(71) Applicant: PGS Geophyscial AS, Oslo (NO)

(72) Inventors: Stian Hegna, Hovik (NO); Tilman Klüver, Sande (NO)

(73) Assignee: PGS Geophyscial AS, Oslo (NO)

( * ) Notice: Subject to any disclaimer, the term of this patent is extended or adjusted under 35 U.S.C. 154(b) by 608 days.

(21) Appl. No.: 16/835,015

(22) Filed: Mar. 30, 2020

(65) Prior Publication Data
US 2020/0333490 A1    Oct. 22, 2020

Related U.S. Application Data

(60) Provisional application No. 62/835,018, filed on Apr. 17, 2019.

(51) Int. Cl.
*G01V 1/34* (2006.01)
*G01V 1/36* (2006.01)

(52) U.S. Cl.
CPC .............. *G01V 1/345* (2013.01); *G01V 1/364* (2013.01); *G01V 2210/56* (2013.01)

(58) Field of Classification Search
CPC ..... G01V 1/345; G01V 1/364; G01V 2210/56
See application file for complete search history.

(56) References Cited

U.S. PATENT DOCUMENTS

| | | | |
|---|---|---|---|
| 2002/0118602 A1* | 8/2002 | Sen | G01V 1/38 367/151 |
| 2011/0103182 A1 | 5/2011 | Martin et al. | |
| 2013/0301386 A1* | 11/2013 | Grion | G01V 1/364 367/24 |
| 2017/0115417 A1 | 4/2017 | van Groenestijn | |
| 2017/0299743 A1* | 10/2017 | Kluver | G01V 1/3808 |

FOREIGN PATENT DOCUMENTS

NO    20151049 A1 *  3/2016

OTHER PUBLICATIONS

PCT/EP2020/060710, International Search Report and Written Opinion dated Jul. 20, 2020.

\* cited by examiner

*Primary Examiner* — Yuqing Xiao
*Assistant Examiner* — Abdallah Abulaban
(74) *Attorney, Agent, or Firm* — Dinsmore & Shohl LLP

(57) ABSTRACT

Processes and systems for imaging a subterranean formation using continuously recorded seismic data obtained during a marine seismic geophysical survey of the subterranean formation are described herein. The processes and systems compute upgoing pressure data at stationary-receiver locations, and low-frequency noise attenuation processes and systems are applied to the upgoing pressure wavefield data to obtain low-frequency noise attenuated upgoing pressure wavefield data. An image of the subterranean formation, or data indicative thereof, may be generated using the low-frequency noise attenuated upgoing pressure wavefield data at stationary-receiver locations.

21 Claims, 20 Drawing Sheets

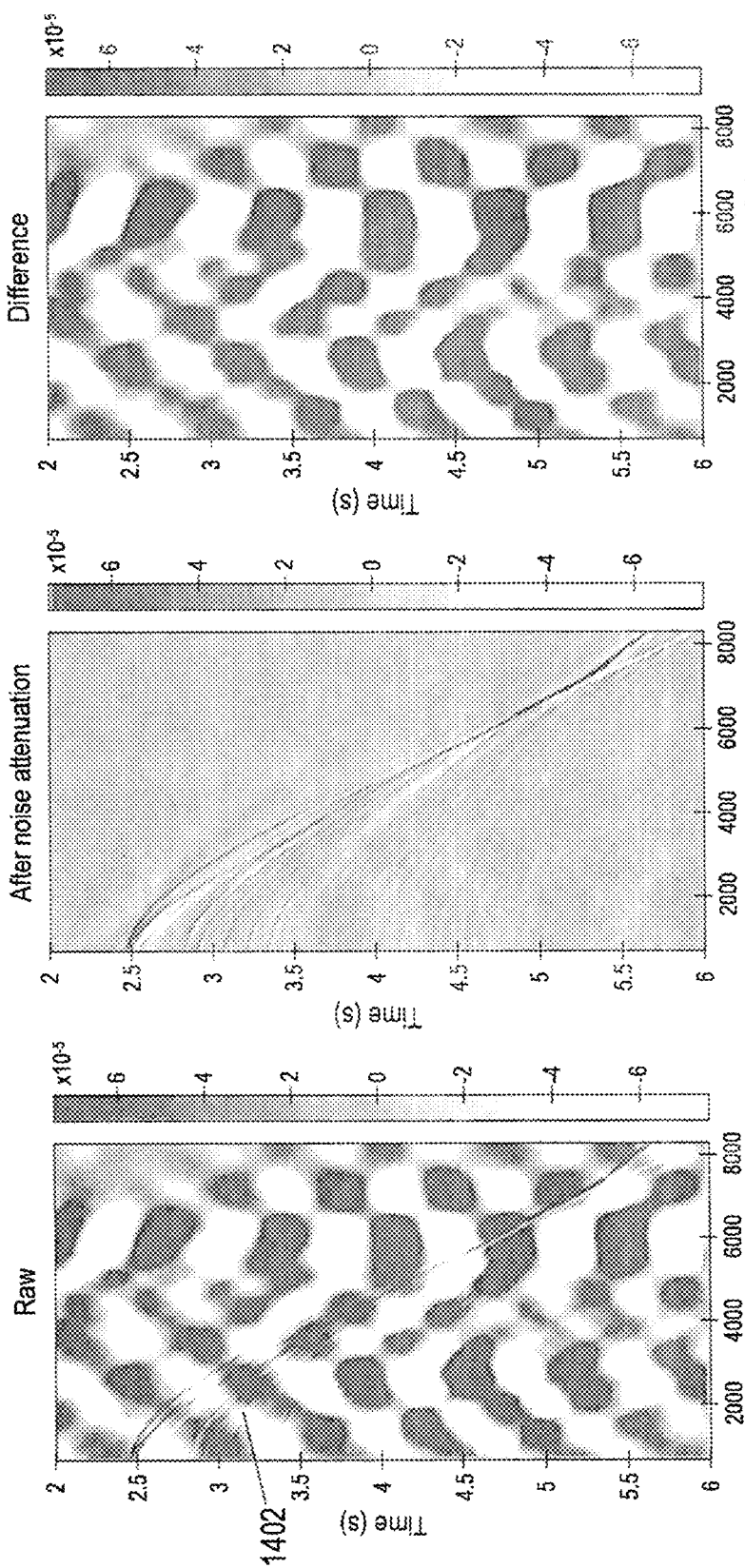

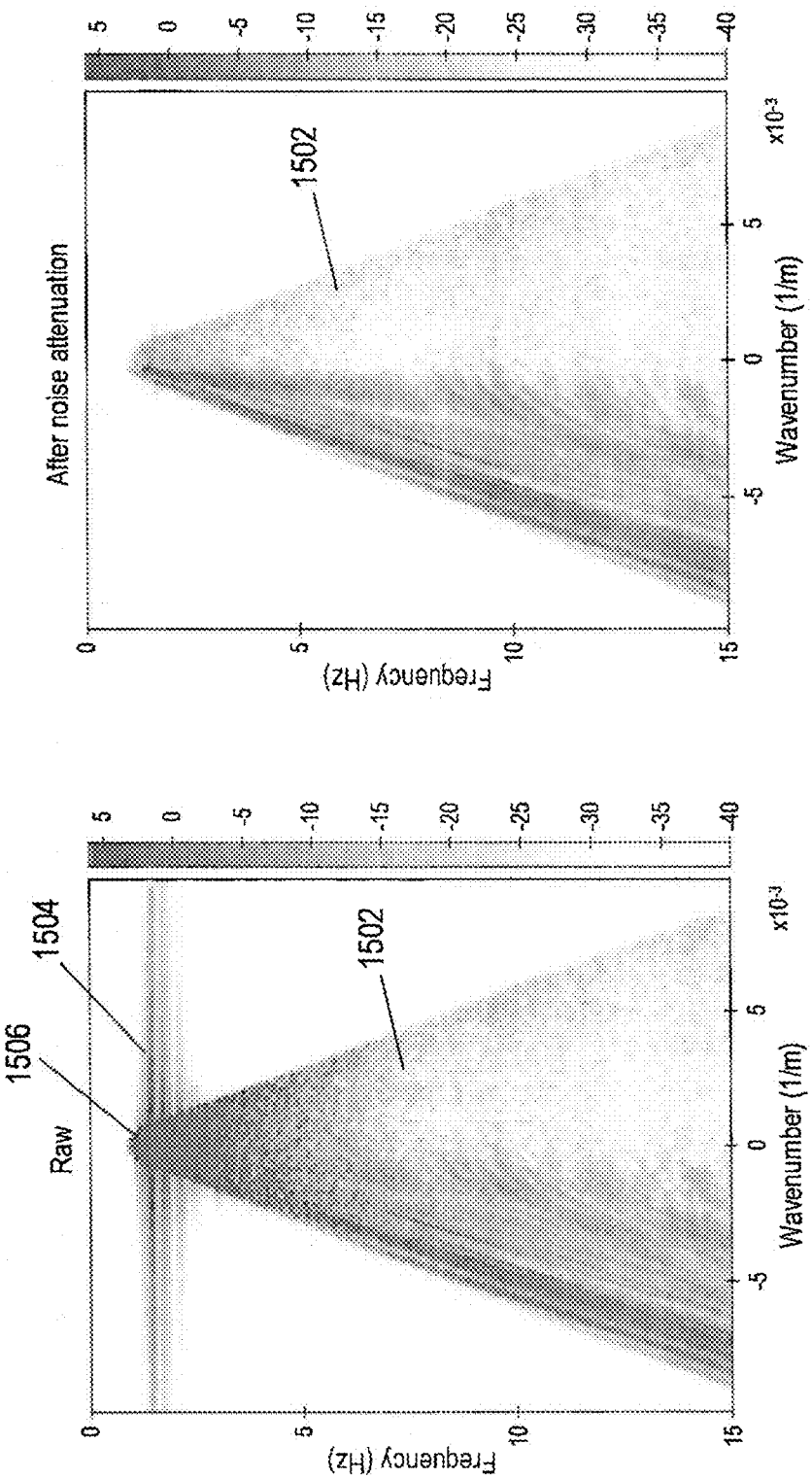

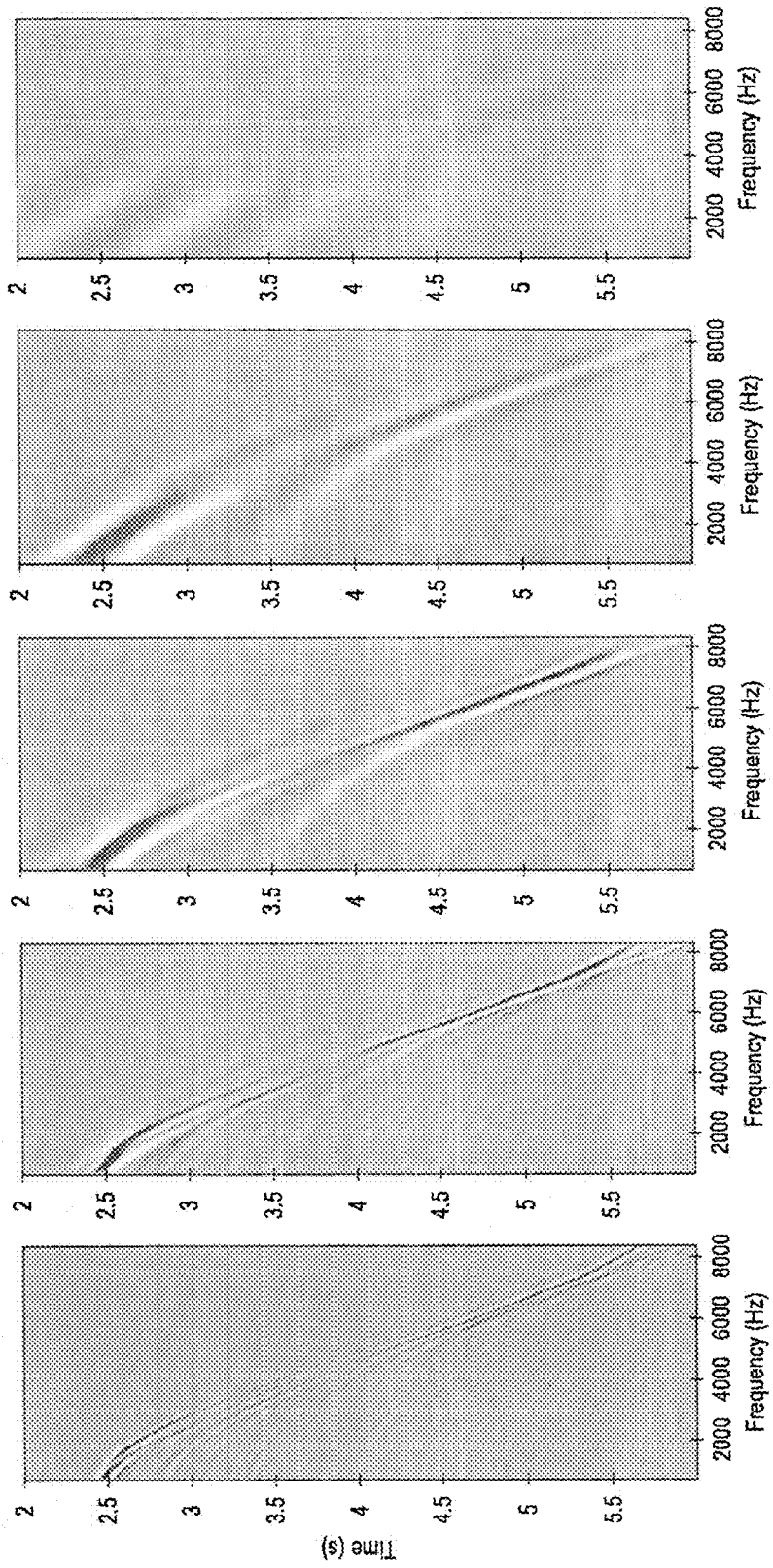

ATTENUATION OF LOW-FREQUENCY NOISE IN CONTINUOUSLY RECORDED WAVEFIELDS

CROSS-REFERENCE TO RELATED APPLICATION

This application claims the benefit of Provisional Application 62/835,018, filed Apr. 17, 2019, which application is hereby incorporated by reference as if entirely set forth herein.

BACKGROUND

Marine seismology companies invest heavily in the development of marine seismic surveying equipment and seismic data processing techniques in order to obtain accurate, high-resolution images of subterranean formations located beneath a body of water. Such images may be used, for example, to determine the structure of the subterranean formations, to discover petroleum reservoirs, and to monitor petroleum reservoirs during production. A typical marine seismic survey is performed with one or more survey vessels that tow one or more seismic sources and many streamers through the body of water. The survey vessel contains seismic acquisition equipment, such as navigation control, seismic source control, seismic receiver control, and recording equipment. A seismic source control controls activation of the one or more seismic sources at selected times or locations. A seismic source typically comprises an array of airguns that are activated to produce acoustic energy that spreads out in all directions. A portion of the acoustic energy travels down through the water and into a subterranean formation to propagate as sound waves within the subterranean formation. At each interface between different types of liquid, rock and sediment, a portion of the acoustic energy is refracted, a portion is transmitted, and another portion is reflected into the body of water to propagate as an acoustic reflected wavefield toward the water surface. The streamers are elongated spaced apart cable-like structures towed behind a survey vessel in the direction the survey vessel is traveling and are typically arranged substantially parallel to one another. Each streamer contains many seismic receivers or sensors that measure pressure wavefield and/or particle motion wavefield properties of the reflected wavefield. The streamers collectively form a seismic data acquisition surface that records the pressure and/or particle motion wavefields as seismic data in the recording equipment. The recorded pressure and/or particle motion wavefields are processed to generate images of the subterranean formation, enabling geoscientist to identify potential hydrocarbon reservoirs that may be suitable for oil and gas extraction and to monitor hydrocarbon reservoirs under production.

DESCRIPTION OF THE DRAWINGS

FIGS. 14A-17E show simulation results that demonstrate the effectiveness of low-frequency noise attenuation processes and systems described herein.

DETAILED DESCRIPTION

Figure 1A:
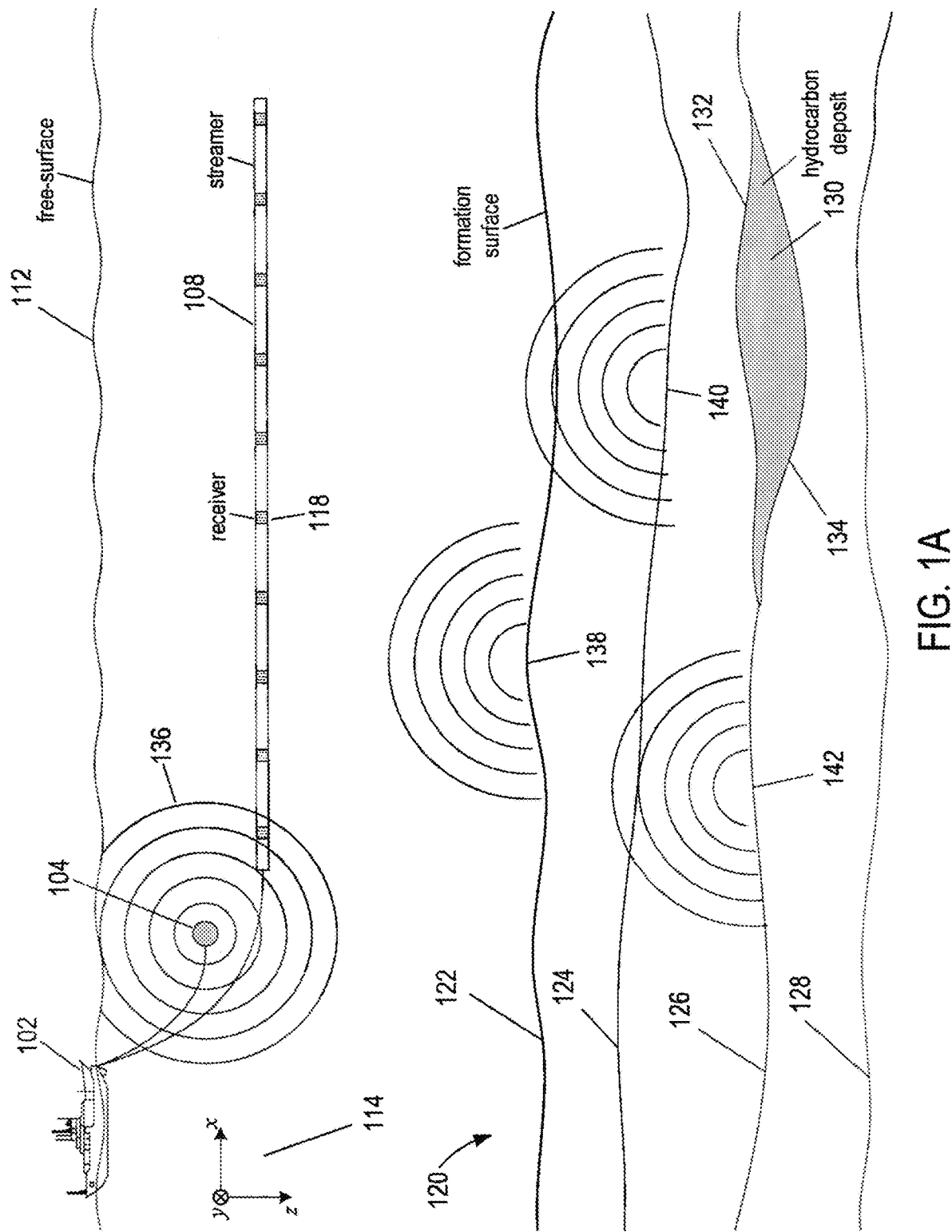
FIGS. 1A-1B show side-elevation and top views of an example marine seismic data acquisition system.

Seismic imaging techniques, such as wave-equation migration methods and Kirchhoff migration, generate images of a subterranean formation by numerically solving an acoustic wave equation that characterizes propagation of acoustic waves in the subterranean formation. Seismic imaging techniques give coordinate locations of reflections within the subterranean formation based on recorded seismic data and velocity models that represent velocities of acoustic wave propagation in the different types of liquids, rocks and sediments of the subterranean formation. The reflections occur at interfaces between layers and features of different compositions and densities, such as interfaces between layers of different kinds of rocks and sediments. The locations of reflections are displayed in an image of a seismic section of the subterranean formation. The image provides a visual representation of complex geophysical structures, such as layers, faults, and petroleum deposits within the subterranean formation. The resolution and accuracy of seismic images depend in large part on the resolution and accuracy of the velocity models. Accurate, high-resolution velocity models may be constructed from recorded seismic data with reliable low-frequency band information (e.g., less than about 20 Hz). High-resolution velocity model construction techniques, such as full waveform inversion, depend on recorded seismic data that is abundant in low-frequency band information. Detailed and accurate high-resolution velocity models lead to high-resolution images and accurate characterization of complex geophysical structures.

Seismic data recorded in a marine survey of a subterranean formation consists of signal and noise components. The signal component is ideally separated from the noise component and used to construct the velocity model and compute an image of the subterranean formation. The noise component may be any recorded energy that interferes with the desired signal component. Low-frequency noise contamination of the velocity model leaks into the final image, reducing image resolution and delineation of subsurface layers and reservoir boundaries. However, separation of the signal from low-frequency noise is a challenging process because of the different types of low-frequency noise. Examples of different types of low-frequency noise include hydrostatic pressure variation noise that ranges from about 0-2 Hz, streamer vibration noise that ranges from about 0-20 Hz, swell noise that ranges from about 1-15 Hz, and tugging/strumming noise from the survey vessel that ranges from about 3-10 Hz.

Various techniques have been developed to try and reduce the adverse effects of low-frequency noise. These include replacing certain conventional airguns in the sources with larger volume airguns to increase the low-frequency signal content in the recorded seismic data. Although large volume airguns increase the signal-to-noise ratio in recorded seismic data, which improves separation of the signal from the noise, low-frequency noise contamination persists in seismic images. Another such noise-reduction technique is to tow streamers at depths greater than the typical streamer-depth range of about 7-10 meters below the water surface. However, recording seismic data at depths below about 10 meters requires a substantial increase in the downward force applied the streamers, which magnifies low-frequency streamer vibration noise recorded by particle motion sensors. Low-frequency streamer vibration noise is strongest near the front ends of the streamers where tension created by forcing the streamers to greater depths is greatest. In addition, noise attenuation techniques have been developed to attenuate low-frequency noise in recorded seismic data. However, conventional low-frequency noise attenuation techniques depend on user parameter adjustments, which is error prone, inaccurate, and time consuming.

This disclosure presents processes and systems that generate images of a subterranean formation from continuously recorded seismic data obtained in a marine seismic survey of the subterranean formation. The processes and systems attenuate low-frequency noise in continuously recorded seismic data, resulting in high-resolution velocity models and images of a subterranean formation with improved resolution that delineates interfaces between subsurface layers and reservoir boundaries more clearly than prior efforts to attenuate low-frequency noise. The low-frequency noise attenuation processes and systems may be performed on seismic data recorded with standard or large volume airguns, streamers deployed at any depth below the free surface, and without time consuming parameter adjustments associated with conventional low-frequency denoising techniques.

Marine Seismic Surveying

Figure 1B:
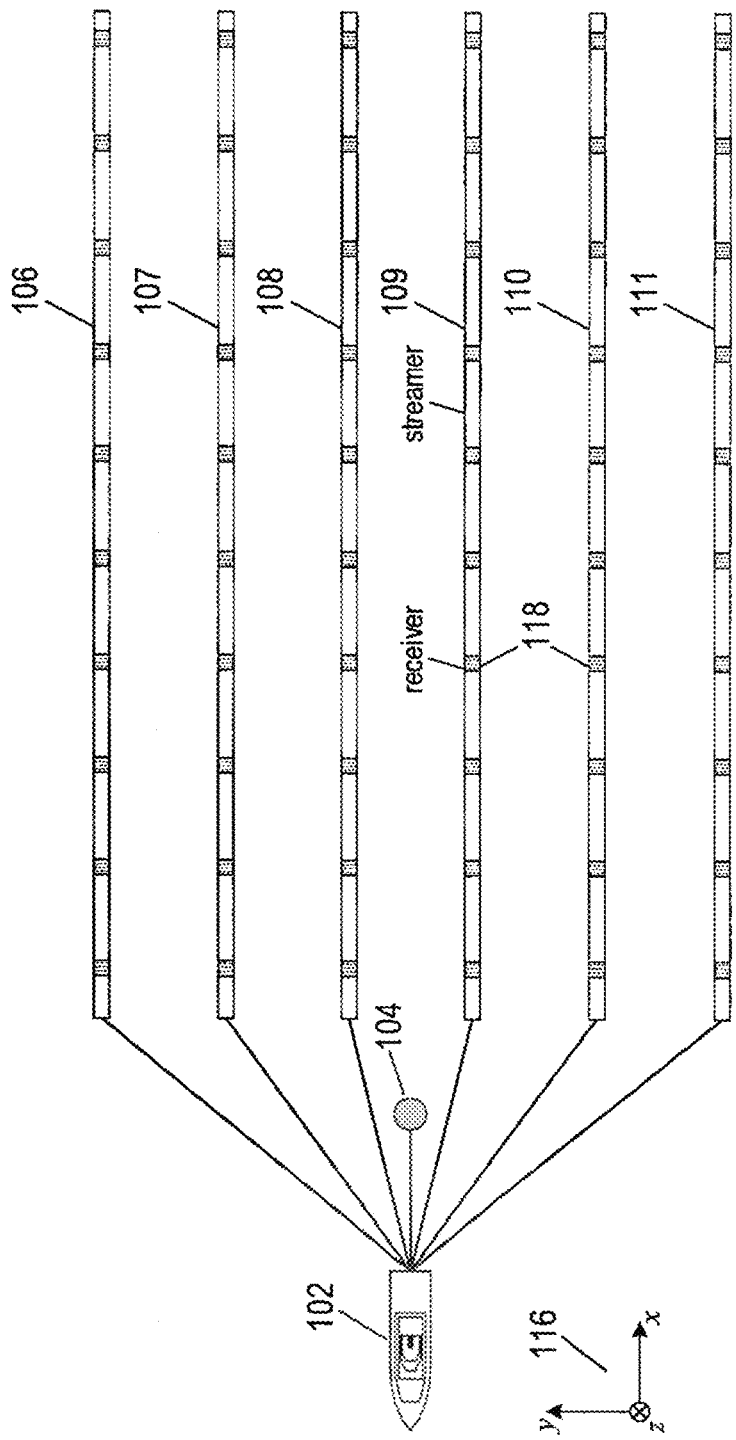

FIGS. 1A-1B show a side-elevation view and a top view, respectively, of an example marine seismic data acquisition system comprising an exploration seismology survey vessel 102 and a seismic source 104. A seismic data acquisition system is not limited to one source as shown in FIGS. 1A-1B. In practice, the number of sources can range from as few as a single source towed by a survey vessel to as many as six or more sources towed by, different survey vessels. The body of water can be, for example, an ocean, a sea, a lake, a river, or any portion thereof. In this example, the survey vessel 102 tows six streamers 106-111 located below the free surface of the body of water. Each streamer is attached at one end to the survey vessel 102 via a streamer data transmission cable. The illustrated streamers 106-111 ideally form a planar horizontal seismic data acquisition surface of the marine seismic data acquisition system with respect to the free surface 112 of the body of water. However, in practice, the streamers may be smoothly varying due to active sea currents and weather conditions. In other words, although the streamers 106-111 are illustrated in FIGS. 1A and 1B to form a planar data acquisition surface, in practice, the towed streamers may undulate because of dynamic conditions of the body of water. A seismic data acquisition surface is not limited to a planar horizontal orientation with respect to the free surface 112. The seismic data acquisition surface may be angled with respect to the free surface 112 or one or more of the streamers may be towed at different depths. A seismic data acquisition surface is not limited to six streamers as shown in FIG. 1B. In practice, the number of streamers used to form a seismic data acquisition surface can range from as few as one streamer to as many as 20 or more streamers.

FIG. 1A includes an xz-plane 114, and FIG. 1B includes an xy-plane 116, of the same Cartesian coordinate system having three orthogonal, spatial coordinate axes labeled x, y and z. The coordinate system specifies orientations and coordinate locations within the body of water. The x-axis specifies the position of a point in a direction parallel to the length of the streamers or the direction of the survey vessel and is referred to as the direction. The y-axis specifies the position of a point in a direction perpendicular to the x-axis and substantially parallel to the free surface 112 and is referred to as the "crossline" direction. The z-axis, also referred to as the "depth" axis, specifies the position of a point in a direction perpendicular to the xv-plane (i.e., perpendicular to the free surface 112), with the positive z-direction pointing pointing downward away from the free surface 112.

The streamers 106-111 are typically long cables containing power and data-transmission lines coupled to receivers (represented in the figure by shaded rectangles) such as receiver 118 that are spaced apart along the length of each streamer. The data transmission lines couple the receivers to seismic data acquisition equipment, computers, and data-storage devices located onboard the survey vessel 102. Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

In FIG. 1A, curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by processing the seismic data collected during a marine seismic survey. As the survey vessel 102 moves over the subterranean formation 120, the seismic source 104 produces acoustic energy over time that spreads out in all directions away from the seismic source 104. For the sake of simplicity, FIG. 1A shows acoustic energy expanding outward from the seismic source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 is called the "source wavefield" and any portion of the pressure wavefield 136 reflected downward from the free-surface 112 is called the "source ghost wavefield." The source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In the body of water, the source wavefield primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the seismic source 104. As shown in FIG. 1A, waves of significant amplitude may be generally reflected from points on or close to the formation surface 122, such as point 138, and from points on or very close to interfaces in the subterranean formation 120, such as points 140 and 142.

The waves comprising the reflected wavefield may be generally reflected at different times within a range of times following the source wavefield. A point on the formation surface 122, such as the point 144, may receive a pressure disturbance from the source wavefield more quickly than a point within the subterranean formation 120, such as points 146 and 148. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
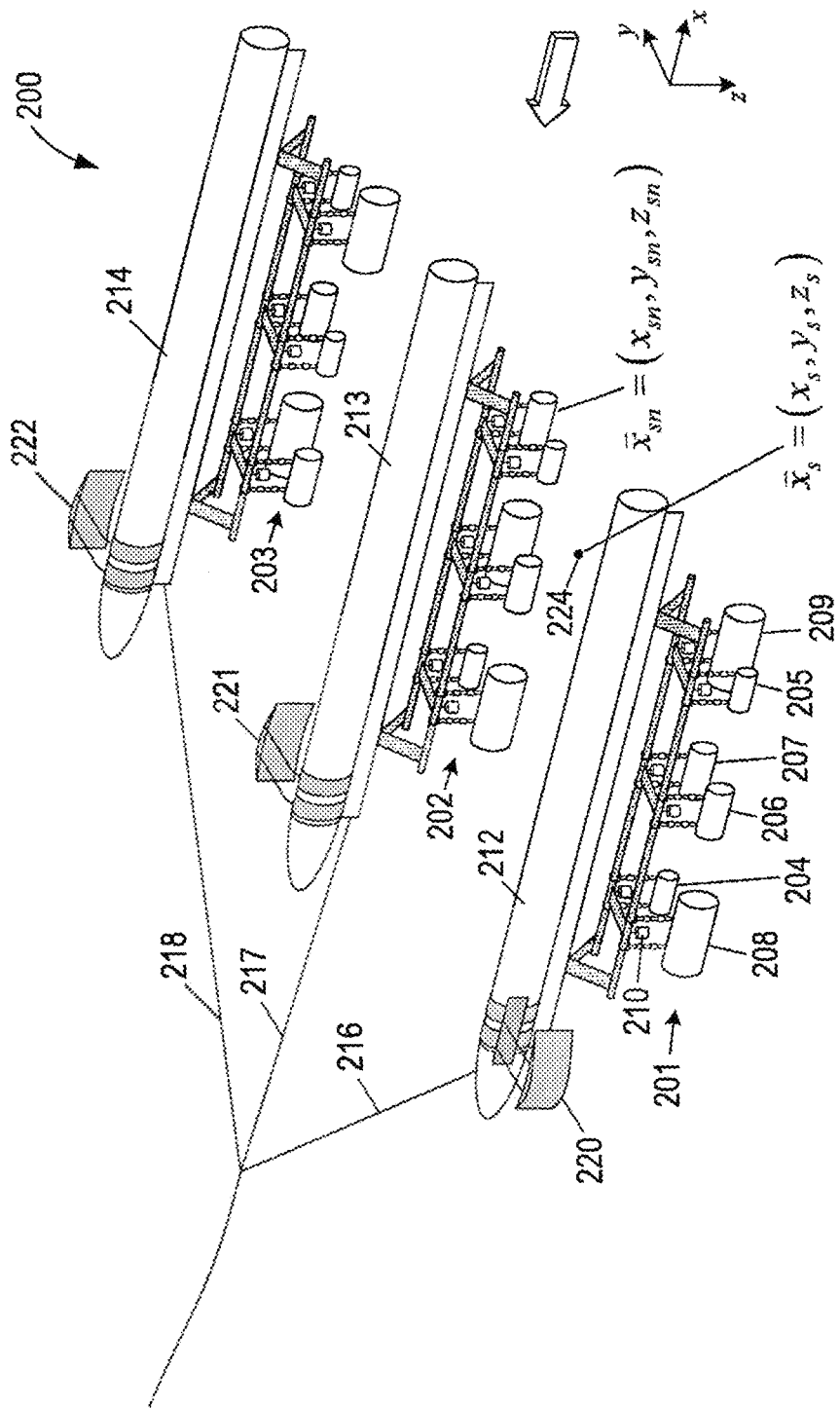
FIG. 2 shows an isometric view of an example source.

The seismic source 104 comprises multiple airguns. FIG. 2 shows an isometric view of an example source 200. The source 200 comprises three sub-arrays 201-203. Each sub-array, in turn, includes six airguns in the illustrated embodiment. Each sub-array comprises two small volume airguns, two medium volume airguns, and two large volume airguns. For example, sub-array 201 comprises two small volume airguns 204 and 205, two medium volume airguns 206 and 207, and two large volume airguns 208 and 209. The configuration of the three different volumes may be different for each sub-array, as it is in the illustrated embodiment. The spectrum of the wavefield generated by an air-gun is generally broad-band, but with peaks and notches related to a fundamental frequency called the "bubble period." The volumes are selected to generate source wavefields over a broad range of frequencies. The large volume airguns generate source wavefields with a low fundamental frequency. The small volume airguns generate source wavefields with a higher fundamental frequency. The medium volume airguns may be selected to generate source wavefields with a fundamental frequency in between the larger and the smaller volume, and with a spectrum that complements the spectra of the wavefields generated by the other volumes. Each sub-array also includes pressure sensors, such as pressure sensor 210. Each pressure sensor is located within the near field of a corresponding airgun (e.g., about 1 meter from a corresponding airgun). For example, pressure sensor 210 is located within the near field of the corresponding airgun 208. The sub-arrays 201-203 are suspended from corresponding floats 212-214 and connected to cables 216-218 that include electrical wires and air hoses that provide electrical activation signals and air to each airgun and transmit electrical signals generated by each pressure sensor back to the survey vessel. In the illustrated embodiment, the seismic source 200 includes steering devices 220-222 that steer and control the direction of the seismic source 200 while being towed through the body of water. Point 224 represents the geometrical center of the array of airguns, and thus of source 200, with Cartesian coordinates denoted by $\vec{x}_s = (x_s, y_s, x_s)$. The Cartesian coordinates of each airgun are denoted by $\vec{x}_{sn} = (x_{sn}, y_{sn}, x_{sn})$, where subscript "n" is an airgun index. In the example of FIG. 2, the seismic source comprises eighteen airguns with n=1, . . . 18.

Figure 3:
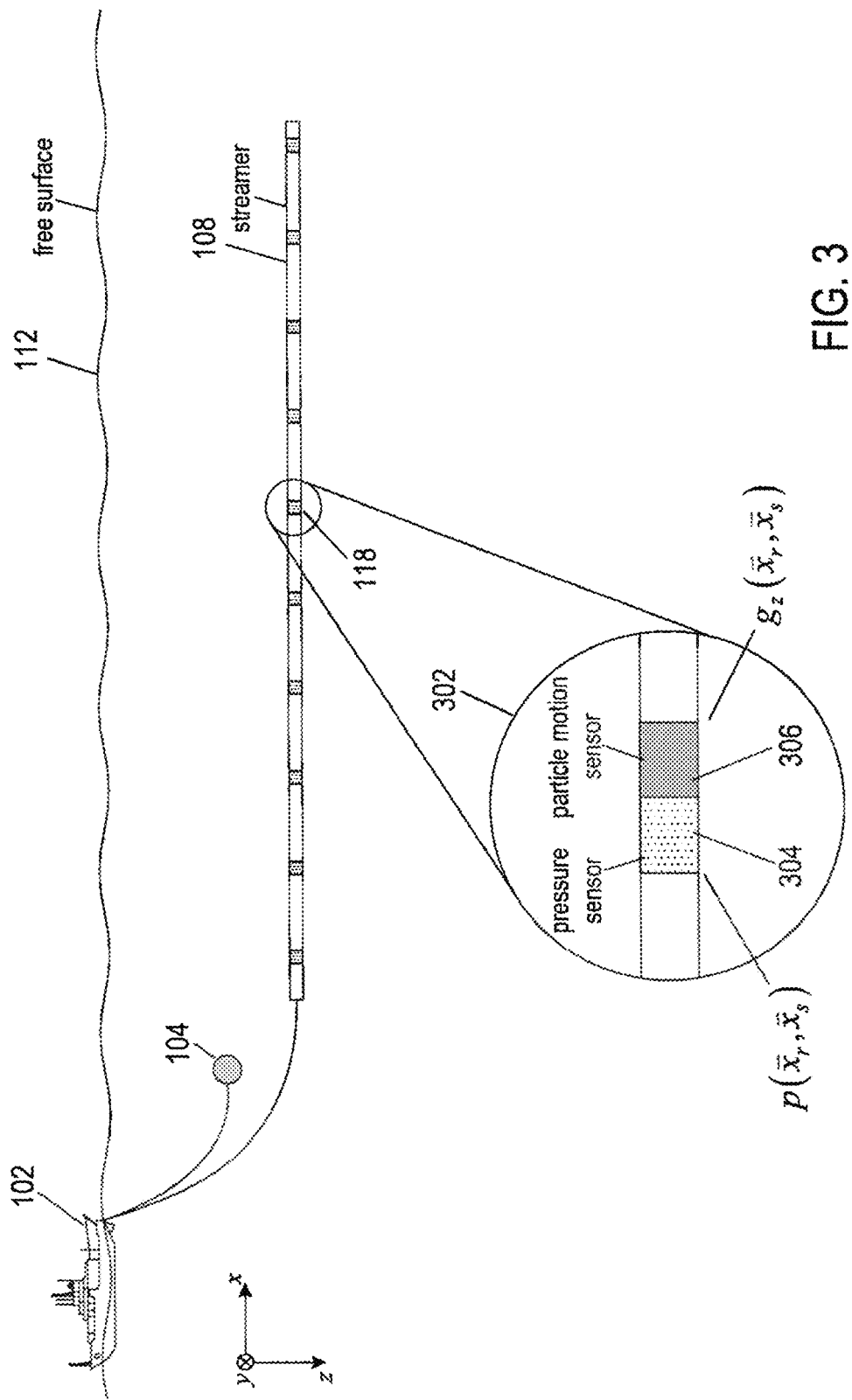
FIG. 3 shows a side-elevation view of an example marine seismic data acquisition system and a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time along one or more axes. FIG. 3 shows a side-elevation view of the marine seismic data acquisition system and a magnified view 302 of the receiver 118. In this example, the magnified view 302 reveals that the receiver 118 is a multicomponent sensor comprising a pressure sensor 304 and a particle motion sensor 306. The pressure sensor may be, for example, a hydrophone. Each pressure sensor is a non-directional sensor that measures changes in a hydrostatic pressure wavefield over time to produce pressure wavefield data denoted by $p(\vec{x}_s, \vec{x}_r, t)$, where t represents time, and $\vec{x}_r$ represents the Cartesian coordinates $(x_r, y_r, z_r)$ of a receiver. The particle motion sensors are directional sensors that are responsive to water motion in a particular direction. In general, particle motion sensors detect particle motion (i.e., displacement velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_r, \vec{x}_s, t)$, where the vector $\vec{n}$ represents the direction along which particle displacement is measured. A particle motion sensor that measures particle velocity (i.e., particle velocity sensor) generates particle velocity wavefield data denoted by $v_{\vec{n}}(\vec{x}_r, \vec{x}_s, t)$. A particle motion sensor that measures particle acceleration (i.e., accelerometer) generates particle acceleration data denoted by $a_{\vec{n}}(\vec{x}_r, \vec{x}_s, t)$. The data generated by one type of particle motion sensor may be converted to another type. For example, particle displacement data may be differentiated to obtain particle velocity wavefield data, and particle acceleration data may be integrated to obtain particle velocity data.

The term "particle motion data" refers to particle displacement data, particle velocity wavefield data, or particle acceleration data. The term "seismic data" refers to pressure wavefield data and/or particle motion data. Pressure wavefield data may also be called the "pressure wavefield." Particle displacement data represents a particle displacement wavefield, particle velocity wavefield data represents a particle velocity wavefield, and particle acceleration data represents a particle acceleration wavefield. The particle displacement, velocity, and acceleration wavefield data are correspondingly called particle displacement, velocity, and acceleration wavefields.

The particle motion sensors are typically oriented so that the particle motion is measured in the vertical direction (i.e., $\vec{n} = (0, 0, z)$) in which case $g_z(\vec{x}_r, \vec{x}_s, t)$ is called vertical wavefield displacement data, $v_z(\vec{x}_r, \vec{x}_s, t)$ is called vertical velocity wavefield, and $a_z(\vec{x}_r, \vec{x}_s, t)$ is called vertical acceleration wavefield. Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, \vec{x}_s, t)$, each receiver may include a particle motion sensor that measures the wavefield in the inline direction in order to obtain the inline velocity wavefield, $v_x(\vec{x}_r, \vec{x}_s, t)$, and a particle motion sensor that measures the wavefield in the crossline direction in order to obtain the crossline velocity wavefield, $v_y(\vec{x}_r, \vec{x}_s, t)$. The three orthogonal velocity wavefields form a velocity wavefield vector $\vec{v} = (v_x, v_y, v_z)$. In certain implementations, the receivers may be only pressure sensors, and in other implementations, the receivers may be only particle motion sensors.

The streamers 106-111 and the survey vessel 102 may include sensing electronics and data-processing facilities that allow seismic data generated by each receiver to be correlated with the time each airgun is activated, absolute positions on the free surface 112, and absolute three-dimensional positions with respect to an arbitrary three-dimensional coordinate system. The pressure wavefield and particle motion wavefield may be stored at the receiver and/or may be sent along the streamers and data transmission cables to the survey vessel 102, where the data may be stored electronically, magnetically, or optically on data-storage devices located onboard the survey vessel 102 and/or transmitted onshore to data-storage devices located in a seismic data-processing facility.

Subterranean formations located beneath a body of water may also be surveyed using ocean bottom seismic techniques. In one implementation, these techniques may be performed with ocean bottom cables ("OBCs") laid on or near the water bottom. The OBCs are similar to towed streamers described above in that the OBCs include spaced-apart receivers, such as collocated pressure and particle motion sensors, deployed approximately every 25 to 50 meters. In another implementation, ocean bottom nodes ("OBNs") may be deployed along the formation surface. Each node may have collocated pressure and particle motion sensors. The OBCs and OBNs may be electronically connected to an anchored recording vessel that provides power, instrument command and control of the pressure and/or vertical velocity data sent to recording equipment located on board the vessel. Traces of continuously recorded seismic data using streamers, as described above, OBCs, or OBNs may be processed as described below.

Each pressure sensor and particle motion sensor may include an analog-to-digital converter that converts time-dependent analog signals into discrete time series data that consists of consecutively measured values called "amplitudes" separated in time by a sample rate. The time series data generated by a pressure or particle motion sensor is called a "trace," which may consist of thousands of samples recorded at a typical sample rate of about 1 to 5 samples per millisecond. A trace includes a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by;

$$tr(\vec{x}_r, \vec{x}_r, t) = \{A(\vec{x}_r, \vec{x}_s, t_l)\}_{l=0}^{L-1} \qquad (1)$$

where tr represents a trace of pressure, particle displacement, particle velocity, or particle acceleration data;

A represents an amplitude of pressure, particle displacement, particle velocity, or particle acceleration data at the time sample;

$t_l$ is the l-th sample time; and

L is the number of time samples in the trace.

The coordinate location $\vec{x}_R$ of each receiver may be calculated from global position information obtained from one or more global positioning devices located along the streamers and/or the towing vessel, from depth measuring devices, such as hydrostatic pressure sensors, and the known geometry and arrangement of the streamers and receivers. The receiver and source locations vary with time and may also be denoted by $\vec{x}_r = \vec{x}_r(t) = (x_r(t), y_r(t), z_r(t))$ and $\vec{x}_s = \vec{x}_s(t) = (x_s(t), y_s(t), z_s(t))$. Each trace also includes a trace header not represented in Equation (1) that identifies the specific receiver that generated the trace, receiver and source GPS spatial coordinates, receiver depth, and may include time sample rate and the number of time samples.

Reflected wavefields from the subterranean formation typically arrive first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather. The portion of the acoustic signal that is reflected into the body of water from the subterranean formation and that travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 4A:
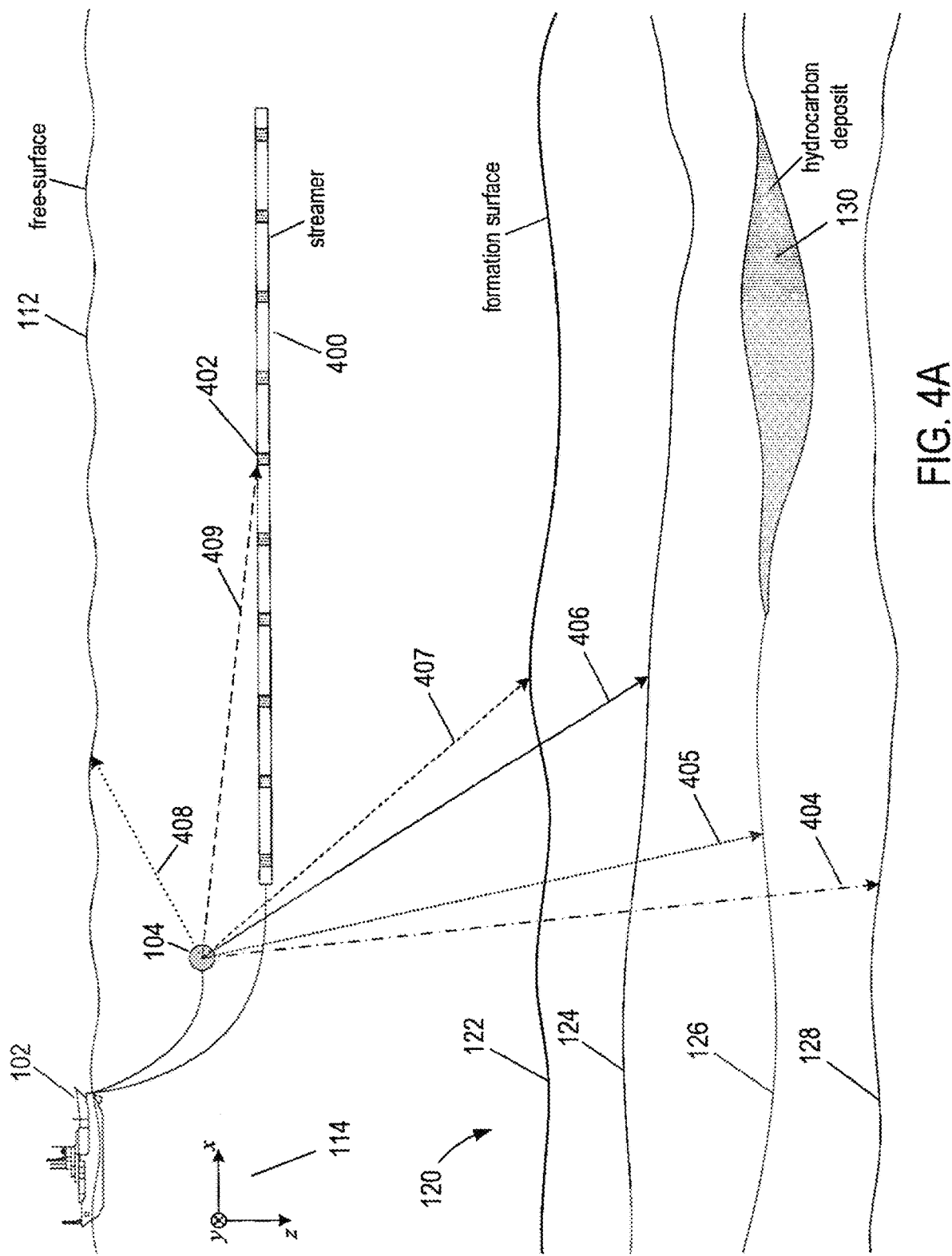
FIGS. 4A-4C show snapshots of different ways in which acoustic energy emitted from a source reverberates between a free surface and a subterranean formation before reaching a receiver.
Figure 4B:
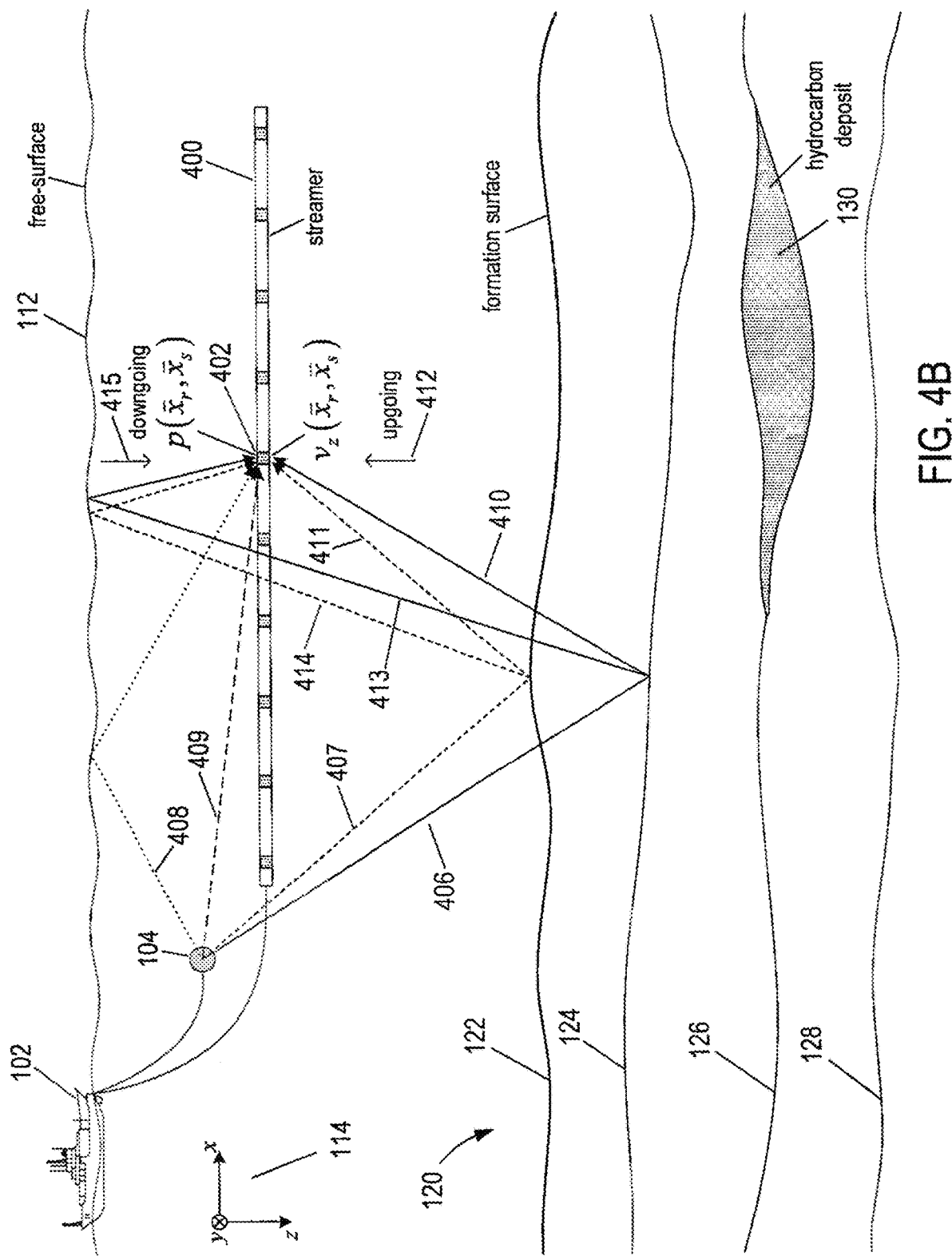
Figure 4C:
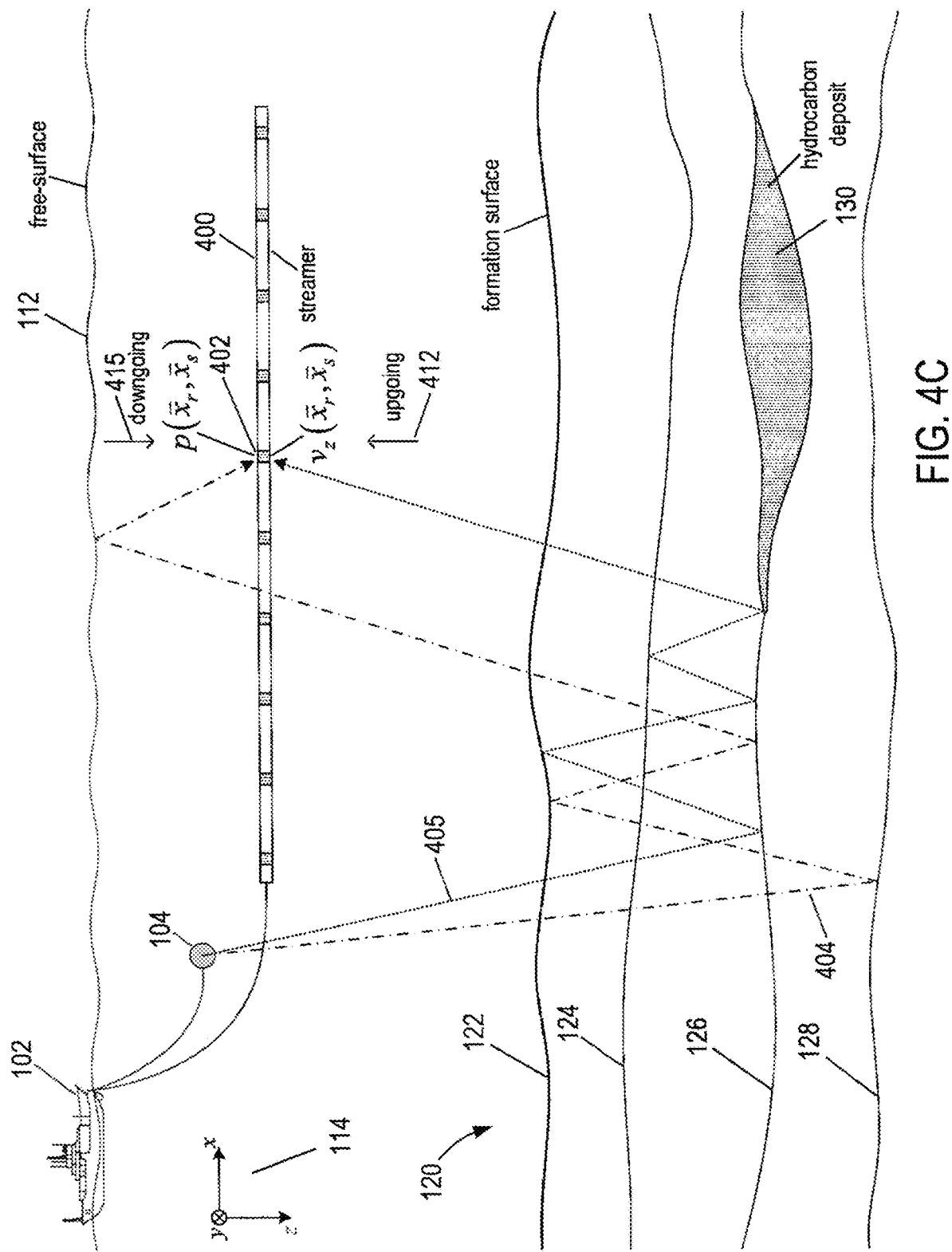

FIGS. 4A-4C show snapshots of different ways in which acoustic energy emitted from the seismic source 104 reverberates between the free surface 112 and the subterranean formation 120 before reaching the receiver 402. For the sake of simplicity, FIGS. 4A-4C illustrate only a few of many possible ray paths acoustic energy of an acoustic signal created by the seismic source 104 may travel before reaching the receiver 402. In FIG. 4A, directional arrows 404-409 represent ray paths of different portions of the source wavefield generated by the seismic source 104. For example, ray paths 404-407 represent portions of the source wavefield that penetrate to different interfaces of the subterranean formation 102, and ray path 408 represents a portion of the source wavefield that reaches the free surface 112. Ray path 409 represents the portion of the source wavefield that travels directly to the receiver 402. In FIG. 4B, ray path 408 is extended to present a downward reflection of the source wavefield from the free surface 112 (i.e., source ghost). Ray paths 410 and 411 represent reflections from the interface 124 and the formation surface 122 that travel directly to the receiver 402, which are called "upgoing primary reflections" or "primaries," as indicated by upgoing directional arrow 412. Ray paths 413 and 414 represent reflections from the interface 124 and the formation surface 122 followed by downward reflections from the free surface 112 before traveling directly to the receiver 402, which are called "downgoing reflections" as indicated by directional arrow 415. In FIG. 4C, ray paths 404 and 405 are extended to represent examples of multiple reflections between interfaces within the subterranean formation 120 and the free surface 112. Extended ray path 404 represents a downgoing free-surface multiple. Extended ray path 405 represents an upgoing multiple. In FIGS. 4B-4C, wavefields that are reflected downward from the free surface 112 before reaching the receivers, as represented by ray paths 413, 414, and 404, are examples of "downgoing wavefields" that may also be called "ghost wavefields" or "receiver ghosts." In FIGS. 4B-4C, wavefields that are reflected upward from the subterranean formation 120 before reaching the receivers, as represented by ray paths 410, 411, and 405, are examples of "upgoing wavefields." Seismic data may also record acoustic energy that propagated along interfaces as head waves (not shown) before being reflected upward to the surface 122. Seismic data may also record acoustic energy that propagated iota layers with velocity gradients that increase with depth due to compression, creating diving waves (not shown) that are gradually turned upward to the surface 122.

Each trace records the direct source wavefield, source ghost, primaries, and various types of free surface and subsurface multiples. For example, pressure wavefield $p(\vec{x}_r, \vec{x}_s, t)$ generated at the receiver 402 records hydrostatic pressure changes due to the source wavefield, source ghost, primaries, and multiples. The vertical velocity wavefield $v_z(\vec{x}_r, \vec{x}_s, t)$ also generated at the receiver 402 records the particle velocity changes due to the direct source wavefield, source ghost, primaries, and multiples. The pressure wavefield $p(\vec{x}_r, \vec{x}_s, t)$ and the vertical velocity wavefield $v_z(\vec{x}_r, \vec{x}_s, t)$ record both upgoing and downgoing pressure and vertical velocity wavefields, respectively, that reach the receiver 402.

In a conventional marine survey, seismic data is recorded in separate shot records while a survey vessel travels along a sail line above a subterranean formation. A typical shot record may be created by activating airguns at the same time or, alternatively, at different times within an activation time interval, followed by recording the subterranean formation response to the source wavefield in a longer recording time interval. The process of activating the source and recording seismic data in a shot record is repeated while the survey vessel travels at a substantially constant speed along the sail line.

Figure 5:
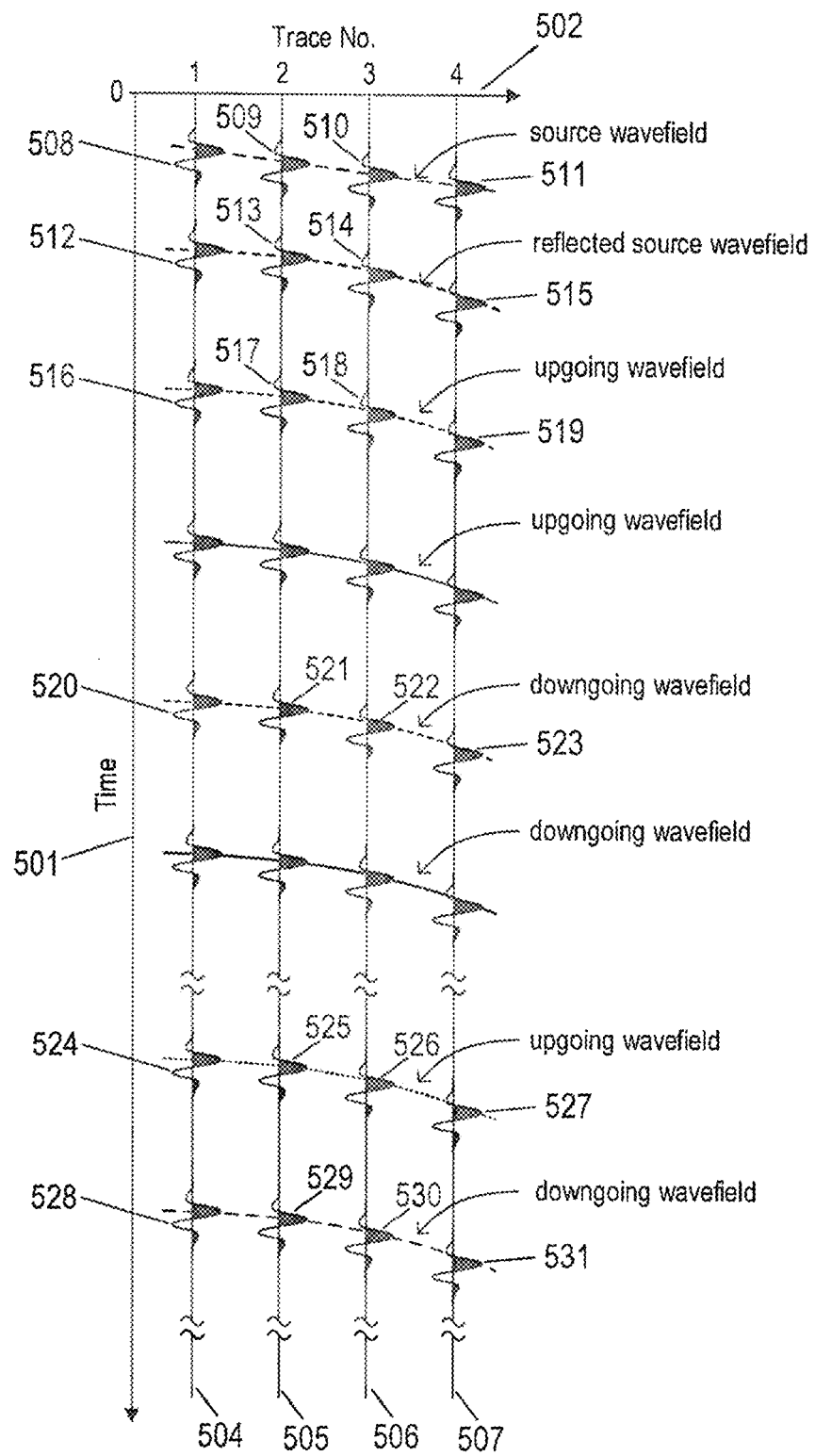
FIG. 5 shows an example common-shot gather of four traces of seismic data created by four adjacent receivers located along a streamer.

FIG. 5 shows an example common-shot gather of four traces of seismic data created by four adjacent receivers located along the streamer 400 shown in FIGS. 4A-4C obtained in a conventional marine survey. Vertical axis 501 represents time. Horizontal axis 502 represents trace numbers (i.e., channels) with trace "1" representing the seismic data generated by a receiver located closer to the seismic source 104 than trace "4" representing the seismic data generated by a receiver located farther away from the seismic source 104. The seismic source 104 is activated at time zero. The distances along the traces 504-507 from time zero to the locations of the wavelets represent travel times of the acoustic energy that is output from the seismic source 104 and eventually reaches the receivers located along the streamer 400. The traces 504-507 may represent variations in the amplitude of either the pressure wavefield or the particle motion wavefield measured by four adjacent receivers of the streamer 400. The example traces record events, such as an impulse wavefield and a reflected wavefield from a surface or interface, as wavelets located along patterned curves that correspond to the example ray paths that reach the receiver 402 in FIGS. 4A-4C. For example, wavelets 508-511 record the source wavefield of the seismic source 104 that travels directly to the receivers as represented by dashed ray path 409 in FIG. 4A. Wavelets 512-515 record the reflected source wavefield (i.e., source ghost) as represented by dotted ray path 408 in FIG. 4B. Wavelets 516-519 record the primary reflected wavefield as represented by dashed-line ray path 411 in FIG. 4B. Wavelets 520-523 record the downgoing reflected wavefield as represented by dashed-line ray path 414 in FIG. 4B. Wavelets 524-527 record the subsurface multiple wavefield as represented by dotted-line ray path 405 in FIG. 4C. Wavelets 528-531 record the free-surface multiple wavefield as represented by dot-dashed-line ray path 404 in FIG. 4C. In FIG. 5, the events are identified as upgoing and downgoing wavefields as represented by the upgoing and downgoing ray paths that reach the receiver 402 in FIGS. 4B and 4C. For the sake of convenience, the traces do not show various types of noise that contaminate seismic data, such as low frequency noise created by various sources.

Continuous Source and Receiver Side Wavefields

Processes and systems described herein attenuate low-frequency noise in continuously recorded seismic data obtained in a marine survey of a subterranean formation. Continuously recorded seismic data may be obtained by activating individual airguns of a source traveling along a sail line at indiscriminate activation times and locations of the sail line, creating a continuous source wavefield with the properties of white noise. While the source travels the sail line, the continuous source wavefield interacts with the subterranean formation producing a reflected wavefield that is continuously emitted from the subterranean formation and recorded as continuously recorded seismic data by receivers.

In the following discussion, the terms "continuously recorded" and "recording continuously" indicate that receivers are actively recording seismic data during a period that is significantly longer than the time period in which seismic data is recorded in a shot record of a conventional marine survey. Seismic data may be continuously recorded along a sail line and yet not recorded during turning of the survey vessel while changing sail lines or during unplanned equipment downtime.

Figure 6:
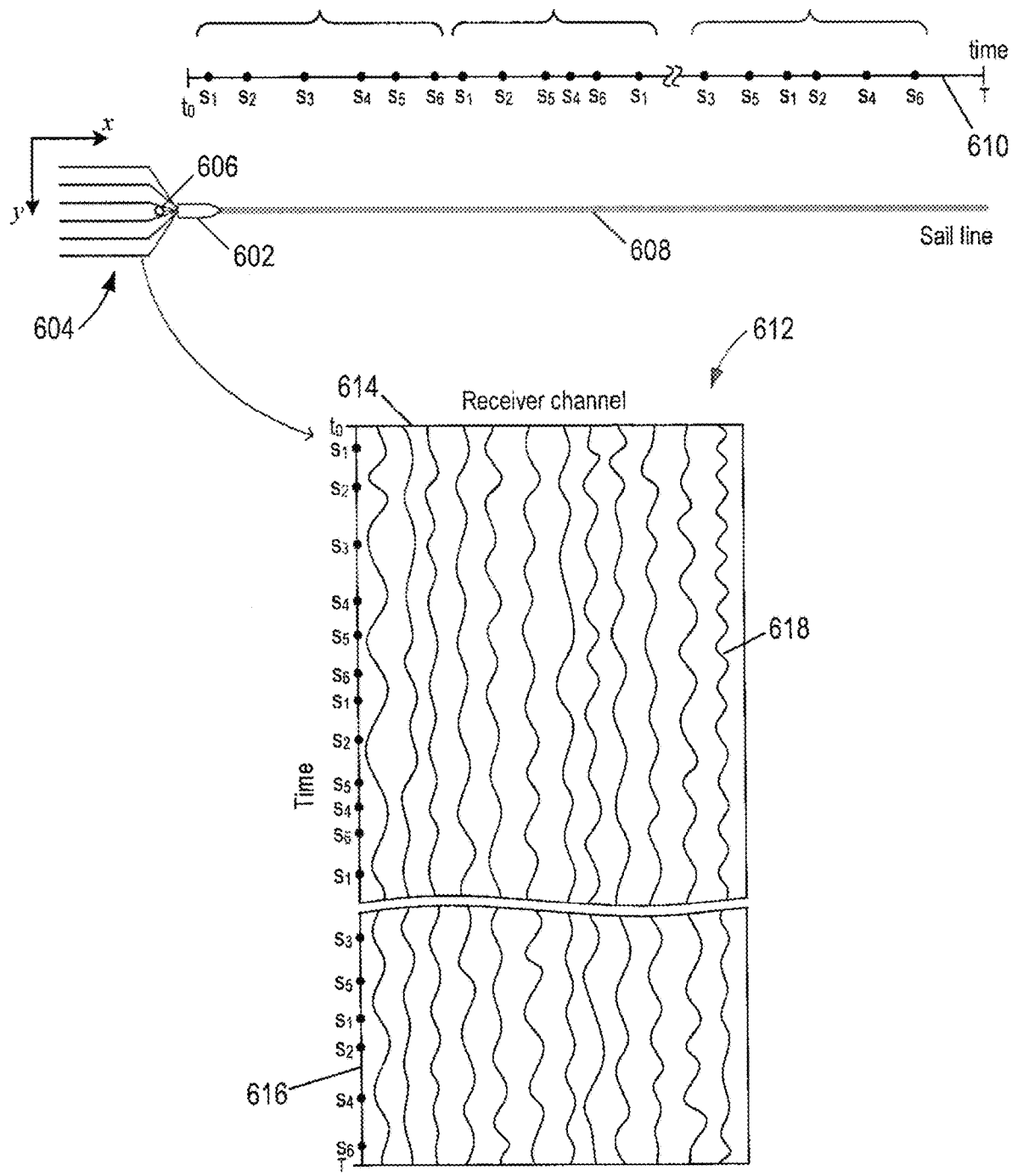
FIG. 6 shows an example of continuous recording of seismic data.

FIG. 6 shows an example of continuous recording of seismic data while a survey vessel travels along a sail line in which airguns of a seismic source are activated at indiscriminate activation times and at indiscriminate locations along the sail line. In FIG. 6, a survey vessel 602 tows six streamers 604 and a source 606 along a sail line 608. In this example, the source 606 comprises six airguns denoted by $s_1$, $s_2$, $s_3$, $s_4$, $s_5$, and $s_6$. FIG. 6 includes a time axis 610 with a start time $t_0$ that represents the time when generation of a continuous source wavefield and continuous seismic data recording begins. The point in time when recording along the sail line 608 stops is represented by stop time T. Closed circles labeled $s_1$, $s_2$, $s_3$, $s_4$, $s_5$, and $s_6$ represent randomized or pseudo-randomized activation times when the airguns are activated between the start time $t_0$ and the stop time T. FIG. 6 also shows a gather 612 of a continuously recorded pressure or particle motion wavefield generated by pressure or particle motion sensors of one of the streamers as the survey vessel 602 travels the sail line 608. The gather 612 includes a receiver (i.e., channel) axis 614 and a time axis 616 that corresponds to the time axis 610 with start time $t_0$ and stop time T. Closed circles located along the time axis 616 correspond to times when the airguns are activated along the time axis 610. Wiggle line 618 represents a trace of continuously recorded seismic data generated by pressure or particle motion sensor or sensor group as the survey vessel 602 travels the length of the sail line 608.

In practice, any number of the traces forming a gather of continuously recorded seismic data may include breaks or blank places where no seismic data is recorded due to equipment stoppage, breakdown, or malfunction. For example, a gather of continuously recorded seismic data may have any number of traces with complete, uninterrupted time samples, while other traces in the same gather may have breaks or blank places due to receiver perturbations and/or interruptions in data transmission from receivers to a data-storage device.

Sail lines are not restricted to straight, linear lines as shown in FIG. 6. Sail lines may be curved, circular or any other suitable non-linear path. In other words, receiver locations may vary in both the x- and y-coordinate locations as a survey vessel travels a sail line. For example, in coil shooting surveys, a survey vessel travels in a series of overlapping, near-continuously linked circular, or coiled, sail lines. The circular geometry of the vessel path results in acquisition of a wide range of offset seismic data across various azimuths to survey a subterranean formation in many different directions. Weather conditions and changing currents may also cause a survey vessel to deviate from a linear path.

Deconvolving a Total Source Wavefield from an Upgoing Pressure Wavefield

Processes and systems precondition the pressure and vertical velocity data by correcting the continuously recorded pressure and particle motion data for associated analogue sensor responses. For example, the pressure data may be corrected for a resistor-capacitance response of the corresponding pressure sensors. The vertical velocity data may be corrected for responses related to a response frequency of the particle motion sensors.

Following pre-conditioning, the pressure wavefield $p(\vec{x}_r, \vec{x}_s, t)$ and vertical velocity wavefield $v_x(\vec{x}_r, \vec{x}_s, t)$ are corrected for receiver motion by associating each time sampled amplitude with the location where the time sampled amplitude was measured. Locations where the time sampled amplitudes of the continuously recorded pressure wavefield $p(\vec{x}_r, \vec{x}_s, t)$ and continuously recorded vertical velocity wavefield $v_x(\vec{x}_r, \vec{x}_s, t)$ are measured are called stationary-receiver locations. The upgoing pressure wavefield is computed from the continuously recorded pressure and vertical velocity wavefields in the frequency-wavenumber domain as follows:

$$P_{up}(\omega, k_{xr}, k_{yr}) = \frac{1}{2} \sum_{x_r} \sum_{y_r} \sum_{t} \left[ p(x_r(t), y_r(t), t) - \frac{\rho\omega}{k_{zr}} v_z(x_r(t), y_r(t), t) \right] \quad (2)$$
$$e^{-i(\omega t + k_{xr} x_r(t) + k_{yr} y_r(t))}$$

where
$i = \sqrt{-1}$:
$k_{xr}$ is a horizontal wavenumber in the inline direction at a receiver;
$k_{yr}$ is a horizontal wavenumber in the crossline direction at a receiver;
$\omega$ is angular frequency:
$\rho$ is the density of the body of water;

$k_{zr} = \sqrt{\left(\frac{\omega}{c}\right)^2 - k_{xr}^2 - k_{yr}^2}$ is the vertical wavenumber;

c is the speed of sound in water;
$p(x_r(t), y_r(t), t)$ is the continuously recorded pressure wavefield; and $v_z(x_r(t), y_r(t), t)$ is the continuously recorded vertical velocity.

Note that the receiver depth and source coordinates are suppressed in Equation (2) for the sake of convenience but the receiver depth and source coordinates are not suppressed in the computations represented in Equations (2) and the computations represented in equations below. The horizontal wavenumber components of the complex-exponential kernel, $\exp[-i(\omega t+k_{xr}x_r(t)+k_{yr}y_r(t))]$, in Equation (2) shift the horizontal coordinates $(x_r(t), y_r(t))$ of the continuously recorded pressure and vertical velocity wavefields to stationary-receiver locations $(x_{str}, y_{str})$. The upgoing pressure wavefield at stationary-receiver locations may be computed by inverse transforming the upgoing pressure wavefield obtained in Equation (2) from the wavenumber-frequency domain to the space-time domain using an inverse fast Fourier transform or an inverse discrete Fourier transform. Transformation of the upgoing pressure wavefield obtained in Equation (2) to the space-time domain is represented by $$P_{up}(\omega, k_{xr}, k_{yr}) \to p_{up}(x_{str}, y_{str}, t) \qquad (3)$$

where $(x_{str}, y_{str})$ are coordinates of a stationary-receiver location.

Transformation of the upgoing pressure wavefield computed using Equation (2) to the space-time domain gives the upgoing pressure wavefield at stationary-receiver locations. When the pressure and vertical velocity wavefields are recorded using stationary receivers, such as receivers located on OBCs or OBNs, the receiver coordinate locations in Equation (5) do not change with respect to time.

Each trace of a gather of seismic data at stationary-receiver locations is called a "stationary-receiver trace" that comprises seismic data recorded at a stationary-receiver location. The term "stationary-receiver" as used herein does not imply that a stationary receiver was used to measure the seismic data contained in a stationary-receiver trace. Because the receivers are moving during continuous seismic data recording as explained above, traces of the continuous wavefield may contain seismic data measured at about the same location. The transformation in Equation (2) applies a spatial phase shift to the traces of the continuous seismic data to form stationary-receiver traces that contain the seismic data as if a stationary receiver had instead been placed at the location. When OBCs are used to record seismic data on the surface of the subterranean formation, correction for receiver motion described above may be omitted.

Figure 7:
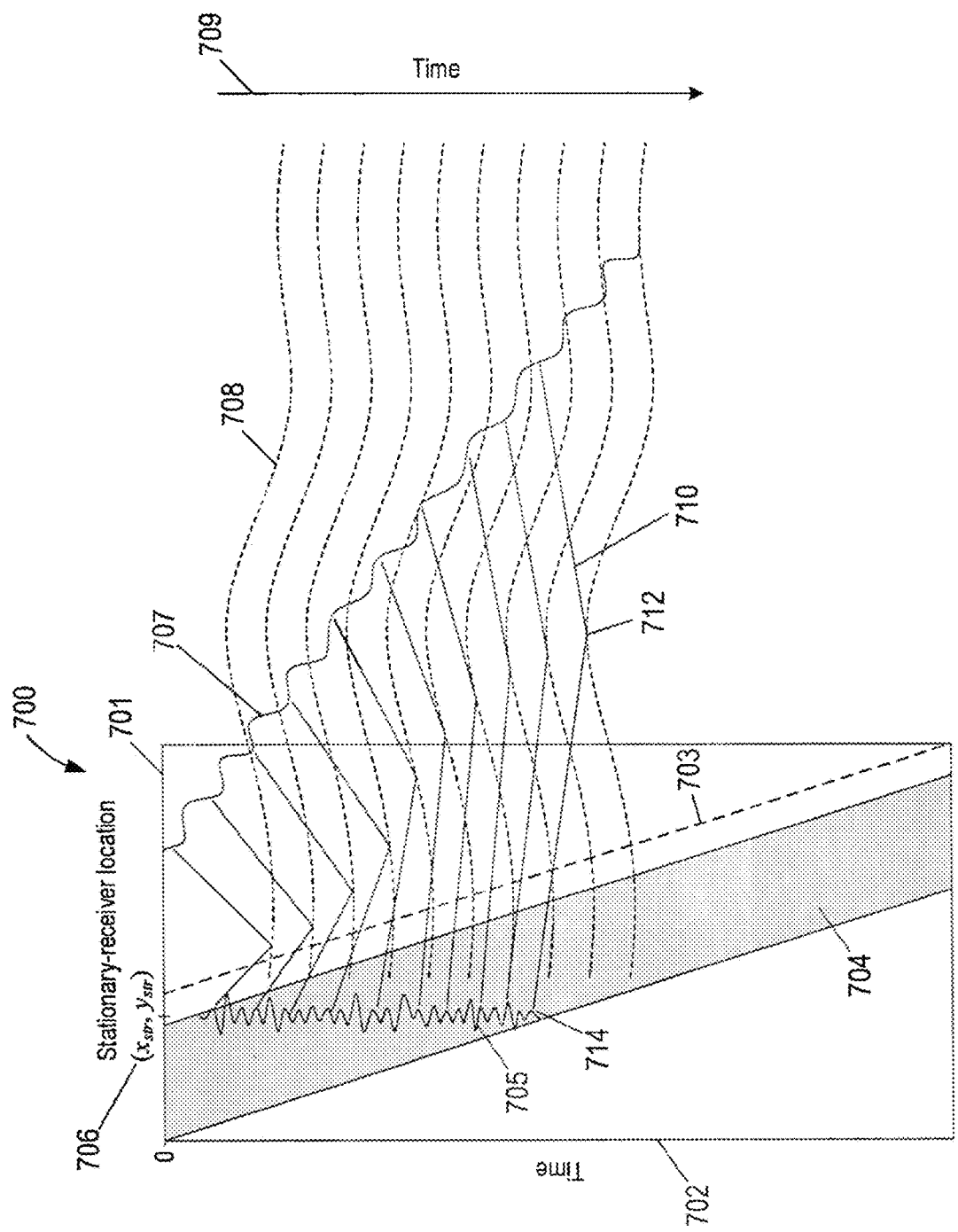
FIG. 7 represents an example matrix of continuous seismic data with traces located at stationary-receiver locations.

FIG. 7 represents an example matrix of continuous seismic data with traces at stationary-receiver locations 700. Horizontal axis 701 represents stationary receiver locations in the inline direction. Vertical axis 702 represents time. Dashed line 703 represents the location of the source in front of the streamer as a function of time. The seismic data is confined to a diagonal strip represented by shaded region 704. The seismic data comprises stationary-receiver traces at stationary-receiver-locations. Unshaded portions of the matrix 700 do not contain seismic data. The stationary-receiver trace 705 contains the seismic data, such as pressure data, vertical velocity data, or upgoing pressure data, that would have been measured by a stationary pressure or particle motion sensor placed at the stationary-receiver location $(x_{str}, y_{str})$ 706. Angled curve 707 represents source signals emitted from the source as a function of time with different offsets relative to the receiver location. Dashed curves, such as dashed curve 708, represent an interface between layers of a subterranean formation with passage of time as represented by time axis 709. Bent lines illustrate portions of the source signal 707 that reflect from points on the interface and correspond to a wavelet in the stationary-receiver trace. For example, bent curve 710 represents a portion of the source signal 707 that is reflected from interface 708 at a point 712 and is record in the stationary-receiver trace 705 as a wavelet 714.

Each trace of the matrix represents the upgoing pressure wavefield at a stationary-receiver location. Each upgoing pressure wavefield trace of the matrix is associated with acoustic signals received from any direction and emitted at any angle from the source. In the space-frequency domain, the upgoing pressure wavefield at each stationary-receiver location is given by:

$$P_{up}(\omega) = \sum_{k_{xs}}\sum_{k_{ys}} S_{tot}(\omega, k_{xs}, k_{ys}) G(\omega, k_{xs}, k_{ys}) \qquad (4)$$

where $k_{xs}$ is the source wavenumber in the inline direction;

$k_{ys}$ is the source wavenumber in the crossline direction;

$S_{tot}(\omega, k_{xs}, k_{ys})$ is the total source wavefield emitted from the source; and $G(\omega, k_{xs}, k_{ys})$ is the earth response to the total source wavefield.

The summations in Equation (4) are over the horizontal source wavenumbers. Equation (4) represents spreading of the source wavefield over all emission angles from the source. The upgoing pressure wavefield $P_{up}(\omega)=P_{up}(\omega, x_{str}=0, y_{str}=0)$ is used for each stationary-receiver location.

The total source wavefield emitted from the source, used in Equation (4), may be represented by $$S_{tot}(\omega, k_{xs}, k_{ys}) = \qquad (5)$$
$$\sum_{x_{sn}}\sum_{y_{sn}}\sum_{t} s_n(t, x_{sn}, y_{sn})[e^{-ik_{zs}z_{sn}} - Re^{ik_{zs}z_{sn}}]e^{-i(\omega t+k_{xs}x_{sn}+k_{ys}y_{sn})}$$

where $[e^{-ik_{zs}z_{sn}}-Re^{ik_{zs}z_{sn}}]$ is a ghost function that re-datums the source wavefield to the free surface;

$$k_{zs} = \sqrt{\left(\frac{\omega}{c}\right)^2 - k_{xs}^2 - k_{ys}^2};$$

R is the reflectivity of the free surface; and $s_n(t, x_{sn}, y_{sn})$ is the signal emitted by a airgun of the source at location $(x_{sn}, y_{sn})$ (See FIG. 2).

The source locations $(x_{sn}, y_{sn})$ are relative to the receiver location. When the airguns of the source are activated simultaneously, the contributions from all airguns are summed to obtain the total source wavefield given by Equation (5). The total source wavefield, $S_{tot}(\omega, k_{xs}, k_{ys})$, represents the source wavefield contribution to the upgoing pressure wavefield $P_{up}(\omega)$ at the stationary-receiver location.

In order to extract the earth response, $G(\omega, k_{xs}, k_{ys})$, from Equation (4), the total source wavefield, $S_{tot}(\omega, k_{xs}, k_{ys})$, is deconvolved from the upgoing pressure wavefield at stationary-receiver locations. $P_{up}(\omega)$. The emission angle of an acoustic signal emitted from the source is related to the frequency of the emitted signal and the vertical wavenumber of the source by $$\cos\theta_s = c\frac{k_{zs}}{\omega} \tag{6}$$

where $\theta_s$ is the emission angle of an acoustic signal from the source.

Figure 8:
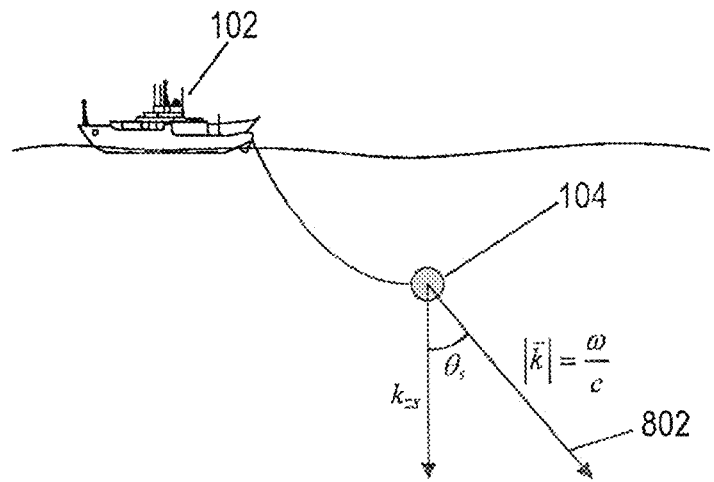
FIG. 8 shows a relationship between an emission angle and propagation direction of an acoustic signal emitted from a source.

FIG. 8 shows a relationship between an emission angle, $\theta_s$, and a propagation direction 802 of an acoustic signal emitted from the source 104. The emission angle cannot be gleaned from a trace of upgoing pressure data at a stationary-receiver location because signals emitted from the source reach the stationary-receive location with different angles. In order to determine the emission angles that are in a trace of upgoing pressure data at a stationary-receiver location, an initial deconvolution is performed by spreading the received signals across the emission angles. This initial source deconvolution can be expressed as $$\tilde{G}(\omega, k_{xs}, k_{ys}) = w(\omega) P_{up}(\omega) \frac{\overline{S}_{tot}(\omega, k_{xs}, k_{ys})}{|S_{tot}(\omega, k_{xs}, k_{ys})|^2 + \varepsilon} \tag{7}$$

where $P_{up}(\omega)$ is the upgoing pressure data in Equation (4);
$w(\omega)$ is a user-defined output wavelet; and
$\tilde{G}(\omega k_{xs}, k_{ys})$ is the estimated earth response of a common-receiver gather.

The total source wavefield is deconvolved from each trace of the upgoing pressure wavefield at stationary-receiver locations, taking all possible emission angles into consideration across horizontal wavenumbers associated with the total source wavefield. Because the total source wavefield is spread across all possible source emission angles, the correct angles of emission are included in the deconvolution process. The total source wavefield may be iteratively deconvolved from each trace of the upgoing pressure data using the following iterative process.

Let j denote an iteration index such that a superscript "(j)" in the following equations denotes iterative steps 1, 2, 3, . . . . For each trace of the upgoing pressure wavefield at stationary-receiver locations, begin by setting an initial upgoing pressure wavefield equal to the upgoing pressure wavefield obtained from wavefield separation represented by Equation (4):

$$P_{up}^{(1)}(\omega) = P_{up}(\omega) \tag{8a}$$

and by setting an initial coherent signal equal to zero:

$$E(\omega, k_{xs}, k_{ys}) = 0 \tag{8b}$$

The earth response may be iteratively computed for j=1, 2, 3, . . . using Equation (7) as follows:

$$\tilde{G}^{(j)}(\omega, k_{xs}, k_{ys}) = w(\omega) P_{up}^{(j)}(\omega) \frac{\overline{S}_{tot}(\omega, k_{xs}, k_{ys})}{|S_{tot}(\omega, k_{xs}, k_{ys})|^2 + \varepsilon} \tag{9}$$

After the earth response, $\overline{G}^{(j)}(\omega, k_{xs}, k_{ys})$, is calculated for each iteration, the coherent signal, $E^{(j)}(\omega, k_{xs}, k_{ys})$, may be extracted from the earth response, $\overline{G}^{(j)}(\omega, k_{xs}, k_{ys})$, using one or more of the following techniques. In one implementation, coherent signals located along hyperbolic trajectories within a specified velocity range are extracted. Hyperbolic reflection events of the hyperbolic trajectories in the earth response, $\overline{G}^{(j)}(\omega, k_{xs}, k_{ys})$, may be identified using automated semblance analysis. The coherent signal, $E^{(j)}(\omega, k_{xs}, k_{ys})$, is extracted by filtering out signals that do not follow the identified hyperbolic reflection events. In another implementation, the coherent signal $E^{(j)}(\omega, k_{xs}, k_{ys})$ corresponds to the energetic events extracted from the earth response in time and space and after plane-wave decomposition. The coherent signal, $E^{(j)}(\omega, k_{xs}, k_{ys})$, is located within a signal cone of the earth response, $\overline{G}^{(j)}(\omega, k_{xs}, k_{ys})$, and is extracted by muting portions of the earth response that are located outside the signal cone (i.e., setting to zero the incoherent signal). With each iteration, the amount of incoherent signal contamination of the earth response, $\overline{G}^{(j)}(\omega, k_{xs}, k_{ys})$, decreases but may still leak into regions outside the signal cone. Muting portions of the earth response that are located outside the signal cone gives the coherent signal, $E^{(j)}(\omega, k_{xs}, k_{ys})$, with less incoherent signal contamination than the coherent signal, $E^{(j-1)}(\omega, k_{xs}, k_{ys})$, that was obtained in the previous iteration. The extracted coherent signal, $E^{(j)}(\omega, k_{xs}, k_{ys})$, for each iteration contains angle information.

After each iterative extraction of the coherent signal $E^{(j)}(\omega, k_{xs}, k_{ys})$ from the earth response $\tilde{G}^{(j)}(\omega, k_{xs}, k_{ys})$, the coherent signal, $E^{(j)}(\omega, k_{xs}, k_{ys})$, contains less incoherent signal contamination and is checked to determine whether the amount of incoherent signal removed is sufficient. The coherent signal, $E^{(j)}(\omega, k_{xs}, k_{ys})$, may be transformed from the frequency-wavenumber domain to the space-time domain to obtain a coherent signal trace at a stationary-receiver location, $e^{(j)}(x^{str}, y_{str}, t)$. The iterative process stops when the following condition is satisfied $$|E^{(j)}(\omega, k_{xs}, k_{ys})| = \sum_{l=0}^{L-1} |e^{(j)}(x_{str}, y_{str}, t_l)|^2 < Th \tag{10}$$

where $e^{(j)}(x_{str}, y_{str}, t_l)$ is an amplitude at time sample $t_l$ of the coherent signal trace $e^{(j)}(x_{str}, y_{str}, t)$; and
Th is a user-defined coherent-signal threshold.

Otherwise, when the condition represented in Equation (10) is not satisfied, the coherent signal. $E^{(j)}(\omega, k_{xs}, k_{ys})$, still contains an unacceptable amount of incoherent signal contamination. A contribution of coherent signals to the upgoing pressure wavefield at the stationary-receiver location is updated as follows:

$$E(\omega, k_{xs}, k_{ys}) = E(\omega, k_{xs}, k_{ys}) + E^{(j)}(\omega, k_{xs}, k_{ys}) \tag{11}$$

The coherent signal contribution to the upgoing pressure wavefield at the stationary-receiver location is computed by $$B_{up}(\omega, x_r, y_r) = \sum_{k_{xs}} \sum_{k_{ys}} S_{tot}(\omega, k_{xs}, k_{ys}) E(\omega, k_{xs}, k_{ys}) \tag{12}$$

The upgoing pressure wavefield at the stationary-receiver location is updated for a next iteration by subtracting the coherent signal contribution from the upgoing pressure wavefield at the stationary-receiver location in the space-frequency domain as follows:

$$P_{up}^{(j+1)}(\omega, x_{str}, y_{str}) = P_{up}^{(j)}(\omega, x_{str}, y_{str}) - B_{up}(\omega, x_{str}, k_{str}) \tag{13}$$

The updated upgoing pressure wavefield at the stationary-receiver location, $P_{up}^{(j+1)}(\omega, x_{str}, y_{str})$, is transformed from the space-frequency domain to the wavenumber-frequency domain to obtain $P_{up}^{(j+1)}(\omega)$. An updated earth response, $\overline{G}^{(j+1)}(\omega, k_{xs}, k_{ys})$, is computed using the updated upgoing pressure wavefield $P_{up}^{(j+1)}(\omega)$ in Equation (8) and the process described above is repeated.

When the iterative process stops because the condition in Equation (10) is satisfied, the coherent signals, $E^{(j)}(\omega, k_{xs}, k_{ys})$, can no longer be extracted from the earth response, $\overline{G}^{(j)}(\omega, k_{xs}, k_{ys})$. Let $\overline{G}^{(final)}(\omega, k_{xs}, k_{ys})$ represent a final earth response obtained from Equation (9) with extracted coherent signals $E^{(j)}(\omega, k_{xs}, k_{ys})$ that do not satisfy the condition in Equation (10). The contribution of the coherent signals, $E(\omega, k_{xs}, k_{ys})$ are added to the final earth response to give:

$$\overline{G}(\omega,k_{xs},k_{ys}) = \overline{G}^{(final)}(\omega,k_{xs},k_{ys}) + E(\omega,k_{xs},k_{ys}) \quad (14)$$

The earth response, $\tilde{G}(\omega, k_{xs}, k_{ys})$, may be transformed from the wavenumber-frequency domain to the space-time domain to obtain an earth response trace, $\tilde{g}(x_{str}, y_{str}, t)$, at the stationary receiver location. The iterative process described above with reference to Equations (8a)-(14) is repeated for each trace (i.e., stationary-receiver location) of the stationary receiver gather of the upgoing pressure wavefield $P_{up}(x_{str}, y_{str}, t)$ to obtain a gather of the earth response traces $\tilde{g}(x_{str}, y_{str}, t)$ at stationary receiver locations.

Low-frequency noise is separated from the signal component of the gather of earth response traces $\tilde{g}(x_{str}, y_{str}, t)$ at stationary receiver locations. The frequency $\omega$ of a sound wave, wavenumber k of the sound wave, and speed c of the sound wave propagating in water are related by $\omega = kc$. Because a signal component of the earth response traces propagates with a phase or wave velocity greater than or equal to c, the signal component lies within a signal region, or cone, defined by frequency-to-wavenumber ratios that are greater than or equal to c (i.e., $\omega/k > c$). The signal cone contains signals that propagates at speeds greater than or equal to c. The signal cone may also contain noise that propagate at speeds greater than or equal to c. The signal cone may be determined by transforming earth response traces $\bar{g}(x_{str}, y_{str}, t)$ at stationary receiver locations from the space time domain to the wavenumber-frequency domain.

Figure 9:
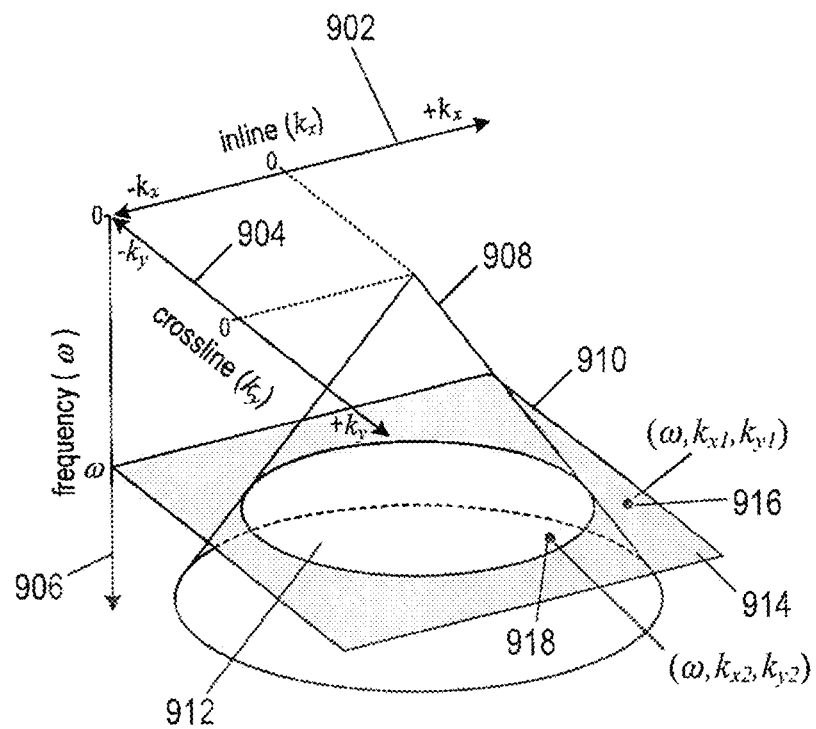
FIG. 9 shows an example signal cone for a trace of seismic data.

FIG. 9 shows an example signal cone for an earth response trace, $\overline{G}(\omega, k_{xs}, k_{ys})$, in the wavenumber-frequency domain. Axis 902 represents inline wavenumbers (i.e., $k_x$) and axis 904 represents crossline wavenumbers (i.e., $k_y$). Axis 906 represents frequencies ($\omega$). A signal cone 908 is a region in the wavenumber-frequency domain with a cone boundary for frequencies and horizontal wavenumbers given by:

$$c = \frac{\omega}{\sqrt{k_x^2 + k_y^2}} \quad (15)$$

Horizontal plane 910 is located at a frequency, $\omega$, and parallel to the inline-crossline coordinate plane. The horizontal plane 910 includes a light shaded circle 912 that corresponds to points located inside the signal cone 908 with the same frequency $\omega$, and dark shaded region 914 that corresponds to points located outside the signal cone 908 with the same frequency $\omega$. Points located in the horizontal plane 910 and outside the signal cone in the dark shade region 914, such as point ($\omega$, $k_{x1}$, $k_{y1}$) 916, have speeds that are less than the speed of sound in water c. Points located in the horizontal plane 910 and inside the light shade circle 912, such as point ($\omega$, $k_{x2}$, $k_{y2}$) 918, have speeds that are greater than the speed of sound in water c. Points located inside the signal cone 908 correspond to the signal component of the earth response trace $\bar{g}(x_{str}, y_{str}, t)$. By contrast, points located outside the signal cone 908 correspond to low-frequency noise that propagates at speeds less than the speed of sound in water c.

Low-frequency noise, denoted by $n_{ext}(x_{str}, y_{str}, t)$, may be extracted from the signal component of the gather of earth response traces $\tilde{g}(x_{str}, y_{str}, t)$ at stationary receiver locations using one of a number of different techniques. For example, the low-frequency noise in the wavenumber-frequency domain, $N_{ext}(\omega, k_{xs}, k_{ys})$, corresponds to energy in the wavenumber-frequency region located outside the signal cone for the earth response trace. The low-frequency noise $N_{ext}(\omega, k_{xs}, k_{ys})$ may be obtained by muting (i.e., setting to zero) the signal component of the earth response $\overline{G}(\omega, k_{xs}, k_{ys})$ obtained in Equation (14), leaving the low-frequency noise $N_{ext}(\omega, k_{xs}, k_{ys})$. Additional techniques include, but are not limited to, detecting anomalously high amplitudes compared to background energy and extracting energy that is not coherent across the gather. The low-frequency noise contribution to the upgoing pressure wavefield at the stationary-receiver location is given by $$N_{up}(\omega, x_{str}, y_{str}) = \sum_{k_{xs}}\sum_{k_{ys}} S_{tot}(\omega, k_{xs}, k_{ys}) N_{ext}(\omega, k_{xs}, k_{ys}) \quad (16)$$

The upgoing low-frequency noise contribution to the upgoing pressure wavefield at the stationary-receiver location obtained in Equation (16) is subtracted from the upgoing pressure wavefield at the stationary-receiver location to obtain low-frequency noise attenuated upgoing pressure wavefield data at the stationary-receiver location as represented by:

$$P_{up}^d(\omega, x_{str}, y_{str}) = P_{up}(\omega, x_{str}, y_{str}) - N_{up}(\omega, x_{str}, y_{str}) \quad (17)$$

Subtraction of the upgoing low-frequency noise at the stationary-receiver location from the upgoing pressure wavefield at the stationary-receiver location may be performed in an iterative, adaptive manner by performing the computational operations represented by Equations (8a)-(17) with the kw-frequency noise attenuated upgoing pressure wavefield data substituted for the upgoing pressure wavefield in Equation (8a) by setting $$P_{up}^{d(1)}(\omega) = P_{up}^d(\omega) \quad (18a)$$

and computing the earth response for the j-th iteration in Equation (9) using:

$$\tilde{G}^{(j)}(\omega, k_{xs}, k_{ys}) = w(\omega) P_{up}^{d(j)}(\omega) \frac{S_{tot}(\omega, k_{xs}, k_{ys})}{|S_{tot}(\omega, k_{xs}, k_{ys})|^2 + \varepsilon} \quad (18b)$$

The iterative process stops when the condition given in Equation (10) is satisfied.

Seismic Imaging

Figure 10:
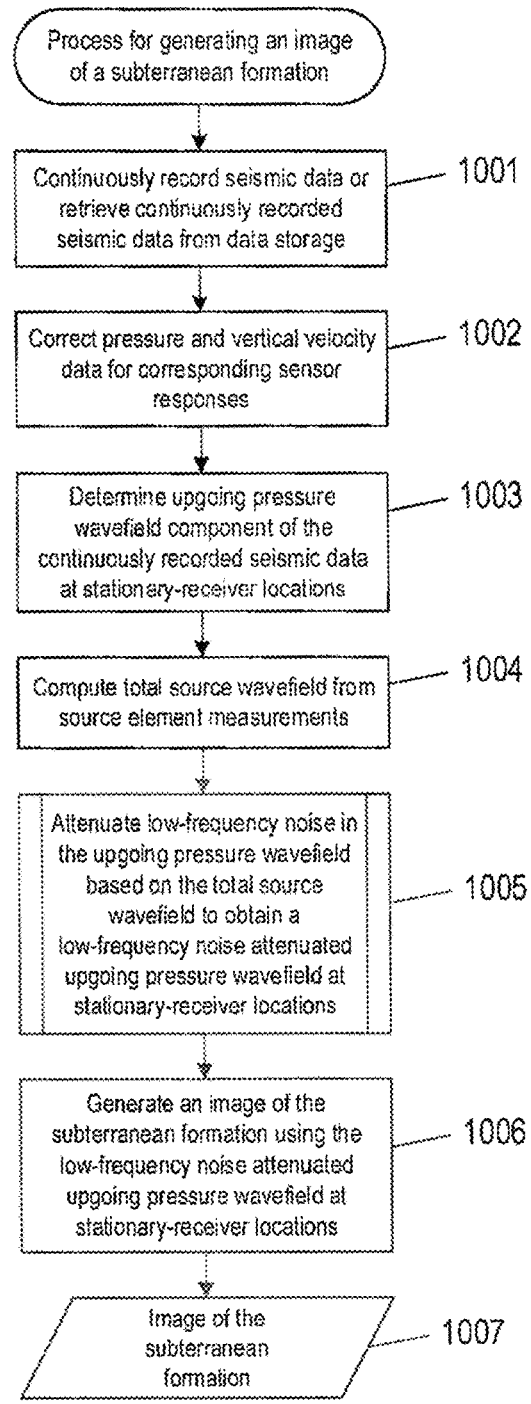
FIG. 10 is a flow diagram of a process for generating an image of a subterranean formation from continuously recorded seismic data obtained in a marine seismic survey.

FIG. 10 is a flow diagram of a process for generating an image of a subterranean formation from continuously recorded seismic data obtained in a marine seismic survey. Each block represents computer implemented machine-readable instructions stored in one or more data-storage devices and executed using one or more processors of a computer system. It should be noted that the series of blocks represented in FIG. 10 is not an exhaustive list of the computational operations executed to compute an image of a subterranean formation from continuously recorded seismic data. Processing may include additional computational operations or certain computational operations may be omitted or placed in a different ordering, depending on, for example, how the seismic data is collected, conditions under which the seismic data is collected, and depth of the body of water above the subterranean formation.

In FIG. 10, block 1001 represents receiving or accessing, from data storage, continuously recorded seismic data from a survey. For example, the continuously recorded seismic data may be continuously recorded pressure and vertical velocity data that were recorded using receivers configured with collocated pressure and particle motion sensors. In block 1002, the continuously recorded pressure and vertical velocity data are corrected for pressure and particle velocity sensor responses as previously described herein. In block 1003, the upgoing pressure wavefield component of the continuously recorded seismic data at stationary-receiver location is determined as described above with reference to Equation (2). In block 1004, the total source wavefield is computed from airgun measurements as described above with reference to Equation (5). In block 1005, an "attenuate low-frequency noise in the upgoing pressure wavefield to obtain low-frequency noise attenuated upgoing pressure wavefield data at stationary-receiver locations" procedure is performed. An example implementation of the "attenuate low-frequency noise in the upgoing pressure wavefield to obtain low-frequency noise attenuated upgoing pressure wavefield data at stationary-receiver locations" procedure is described below with reference to FIGS. 11-12. In block 1006, an image of the subterranean formation 1006 (or data indicative thereof) is generated using the low-frequency noise attenuated upgoing pressure wavefield data at the stationary-receiver locations. The low-frequency noise attenuated upgoing pressure wavefield data may be used to compute a velocity model with attenuated low-frequency noise. The velocity model may then be used with time or depth migration applied to the low-frequency noise attenuated upgoing pressure wavefield data to obtain an image of the subterranean formation (or data indicative there, such as so-called "final migration data"). The resulting image is not contaminated by the low-frequency noise.

Figure 11:
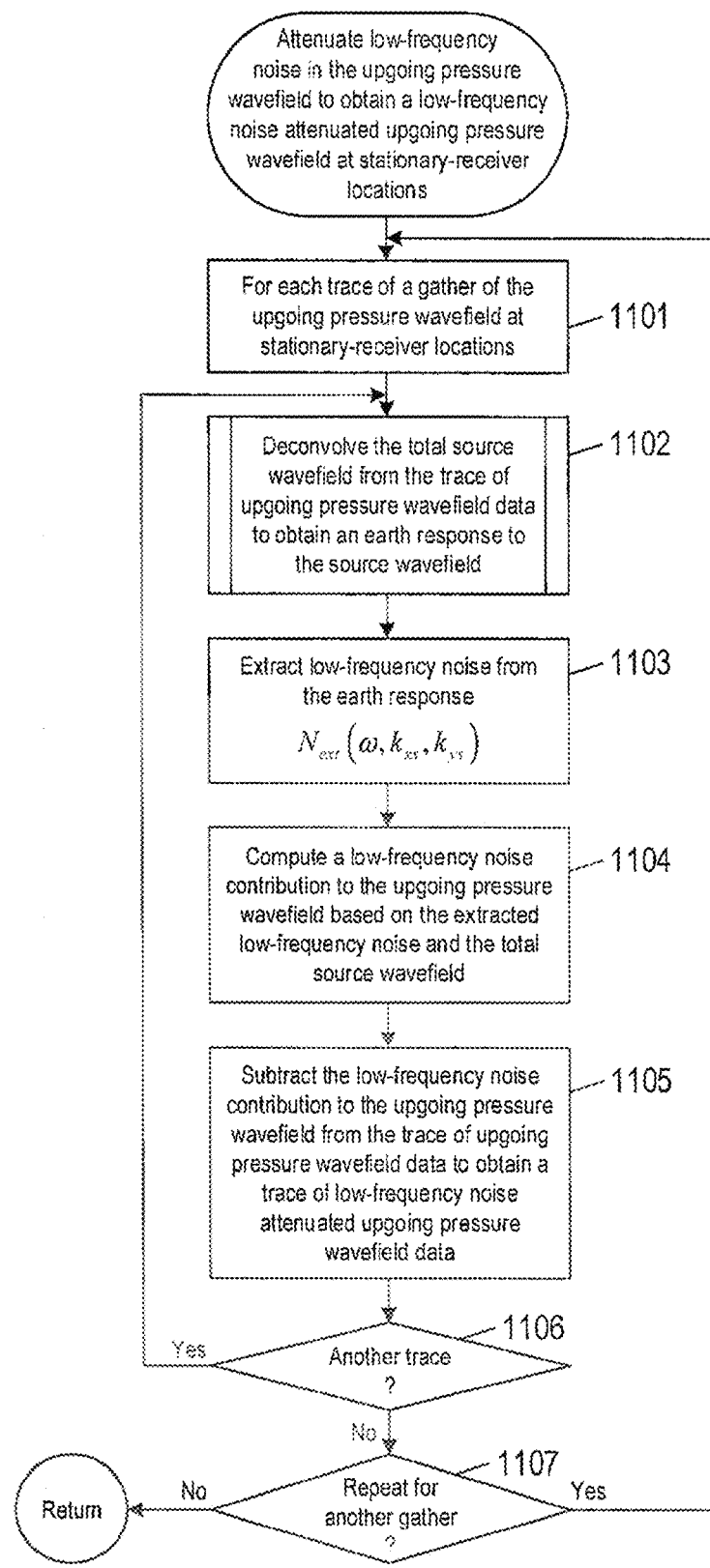
FIG. 11 is a flow diagram illustrating an example implementation of the "attenuate low-frequency noise in the upgoing pressure wavefield to obtain low-frequency noise attenuated upgoing pressure wavefield data at stationary-receiver locations" procedure performed in FIG. 10.

FIG. 11 is a flow diagram illustrating an example implementation of the "attenuate low-frequency noise in the upgoing pressure wavefield to obtain low-frequency noise attenuated upgoing pressure wavefield data at stationary-receiver locations" procedure performed in step 1005 of FIG. 10. A loop beginning with block 1101 repeats the computational operations represented by blocks 1102-1106 for each trace of gather of the upgoing pressure wavefield at stationary-receiver locations. In block 1102, a "deconvolve the total source wavefield from the trace of upgoing pressure wavefield data to obtain an earth response to the source wavefield" procedure is performed. An example implementation of the "deconvolve the total source wavefield from the trace of upgoing pressure wavefield data to obtain an earth response to the source wavefield" procedure is described below with reference to FIG. 12. In block 1103, low-frequency noise is extracted from the earth response as described above with reference to FIG. 9. In block 1104, a low-frequency noise contribution to the upgoing pressure wavefield is computed based on the extracted low-frequency noise and the total source wavefield as described above with reference to Equation (16). In block 1105, the low-frequency noise contribution to the upgoing pressure wavefield is subtracted from the trace of upgoing pressure wavefield data to obtain a trace of noise attenuated upgoing pressure wavefield data as described above with reference to Equation (17). Decision block 1106 repeats blocks 1102-1105 for each remaining trace of the gather of the upgoing pressure wavefield at stationary-receiver locations. In decision block 1107, the operations represented by blocks 1101-1106 are repeated for remaining gathers of the low-frequency noise attenuated upgoing pressure wavefield data as described above with reference to Equations (18a) and (18b).

Figure 12:
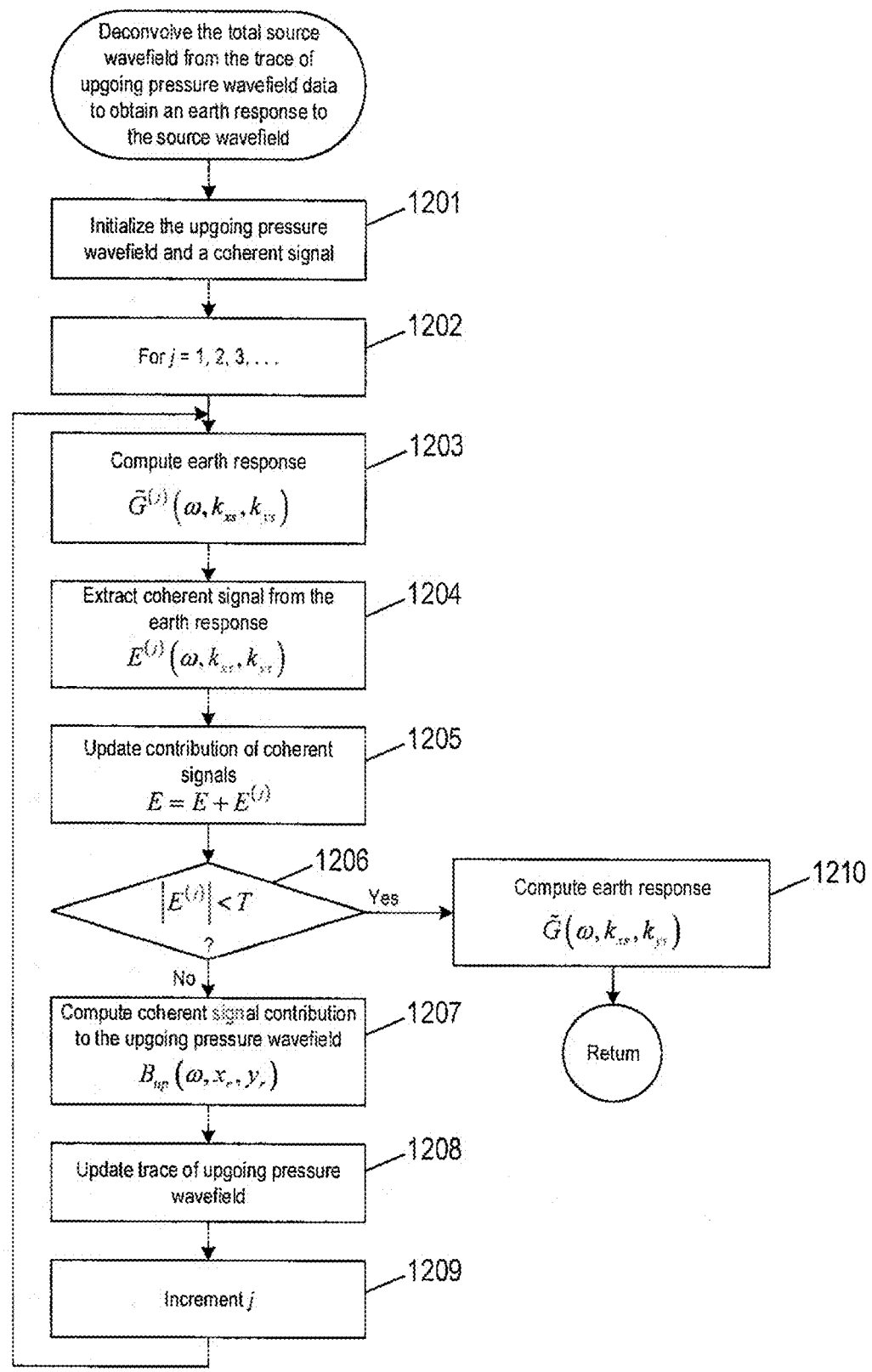
FIG. 12 is a flow diagram illustrating an example implementation of the "deconvolve the total source wavefield from the trace of upgoing pressure wavefield data to obtain an earth response to the source wavefield" procedure performed in FIG. 11.

FIG. 12 is a flow diagram illustrating an example implementation of the "deconvolve the total source wavefield from the trace of upgoing pressure wavefield data to obtain an earth response to the source wavefield" procedure performed in step 1102 of FIG. 11. In block 1201, an initial upgoing pressure wavefield is initialized using the upgoing pressure wavefield obtained in block 1003 of FIG. 10. A loop beginning with block 1202 iterates the computational operations represented by blocks 1203-1209 to obtain the earth response in block 1210. In block 1203, the earth response is computed as described above with reference to Equation (9). In block 1204, a coherent signal is extracted from the earth response computed in block 1203. For example, the coherent signal may be extracted by filtering out signals that do not follow identified hyperbolic reflection events of the earth response or by muting incoherent portions of the earth response that are located outside the signal cone of the earth response. In block 1205, a contribution of coherent signals to the upgoing pressure wavefield at the stationary-receiver location is computed as described above with reference to Equation (11). In decision block 1206, when the contribution to the coherent signal is greater than a coherent-signal threshold as described above with reference to the condition in Equation (10), control flows to block 1207. In block 1207, a coherent signal contribution to the upgoing pressure wavefield is computed as described above with reference to Equation (12). In block 1208, the trace of upgoing pressure wavefield data is updated as described above with reference to Equation (13). In block 1209, the iteration index j is incremented. If in block 1206 the contribution to the coherent signal is less than or equal to the coherent-signal threshold, then in block 1210 the earth response is computed based on the contribution of coherent signals obtained in block 1205 as described above with reference to block 1205.

Figure 13:
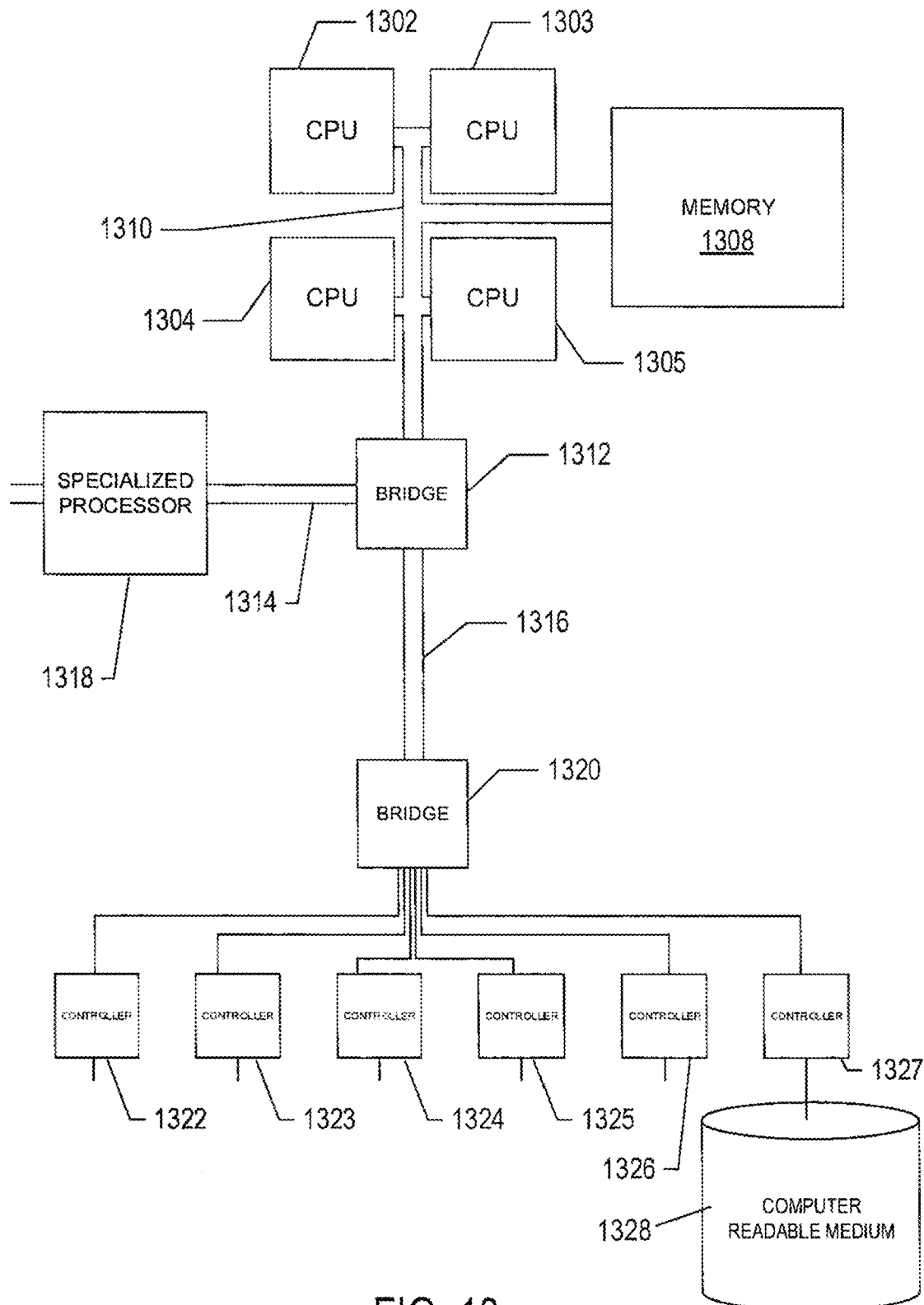
FIG. 13 shows an example computer system that may be used to execute an efficient process for generating an image of subterranean formation.

FIG. 13 shows an example computer system that may be used to execute an efficient process for generating an image of subterranean formation according to methods described here, and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1302-1305, one or more electronic memories 1308 interconnected with the CPUs by a CPU/memory-subsystem bus 1310 or multiple busses, a first bridge 1312 that interconnects the CPU/memory-subsystem bus 1310 with additional busses 1314 and 1316, or other types of high-speed interconnection media, including multiple, high-speed serial interconnects. The busses or serial interconnections, in turn, connect the CPUs and memory with specialized processors, such as a graphics processor 1318, and with one or more additional bridges 1320, which are interconnected with high-speed serial links or with multiple controllers 1322-1327, such as controller 1327, that provide access to various different types of computer-readable media, such as computer-readable medium 1328, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1328 is a data-storage device, which may include (for example) electronic memory, optical or magnetic disk drive, a magnetic tape drive, USB drive, flash memory and any other such data-storage device or devices. The computer-readable medium 1328 can be used to store machine-readable instructions that encode the computational methods described above. It or similar devices can also be used to store geophysical data that results from application of the above methods to recorded seismic signals.

The processes and systems disclosed herein may be used to manufacture a geophysical data product indicative of certain properties of a subterranean formation. A geophysical data product may be manufactured by using the processes and systems described herein to generate geophysical data and storing the geophysical data in a computer-readable medium 1328. The geophysical data may be pressure data, vertical velocity data, upgoing and downgoing wavefields, and any image of a subterranean formation computed using the processes and systems described herein. The geophysical data product may be produced offshore (i.e., by equipment on the survey vessel 102) or onshore (i.e., at a computing facility on land), or both.

Simulation Results

FIGS. 14A-17E show before and after results obtained from applying the low-frequency noise attenuation processes and systems described herein to continuously recorded raw seismic data contaminated with low-frequency noise. The results shown in FIGS. 14A-17E demonstrate the effectiveness of low-frequency noise attenuation processes and systems described herein.

FIG. 14A shows a gather of the raw seismic data in the space-time domain. The low-frequency noise appears as unevenly distributed black and white ripples that obscure reflection events 1402 (the reflection events begin to appear at about 2.5 seconds). FIG. 14B shows a gather of the seismic data after low-frequency noise attenuation, with the reflection events readily observable and low frequency noise effects substantially reduced. FIG. 14C shows the low-frequency noise itself, obtained by subtracting the gather in FIG. 14B from the low-frequency noise contaminated gather shown in FIG. 14A.

FIG. 15A shows the raw seismic data of FIG. 14A transformed to the wavenumber-frequency domain. Coherent signals are located within a signal cone 1502. The low-frequency noise in the raw seismic data is exhibited by dark streaks 1504 and dark shading 1506 near the apex of the signal cone 1502. FIG. 15B shows the raw seismic data after noise attenuation. Noise attenuation has removed the low-frequency noise exhibited by the dark streaks 1504 and dark shading 1506 in FIG. 14A.

Figure 16A:
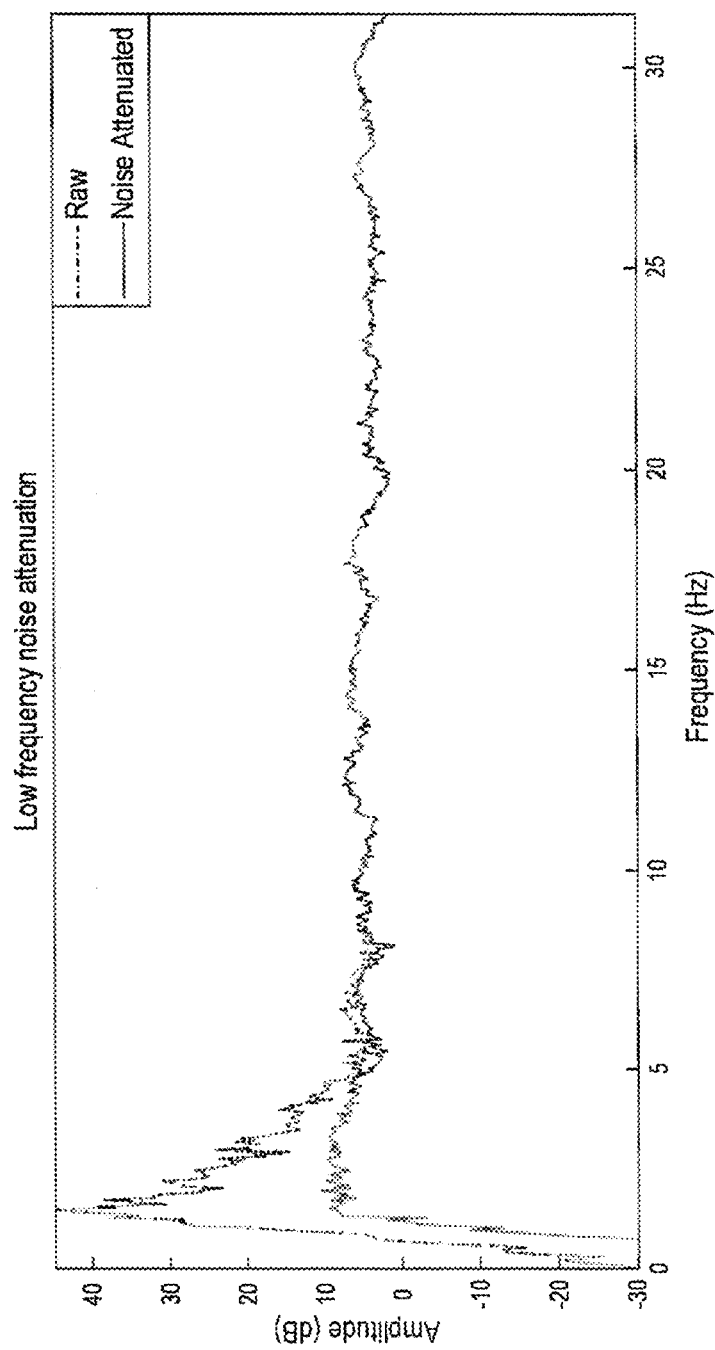
Figure 16B:
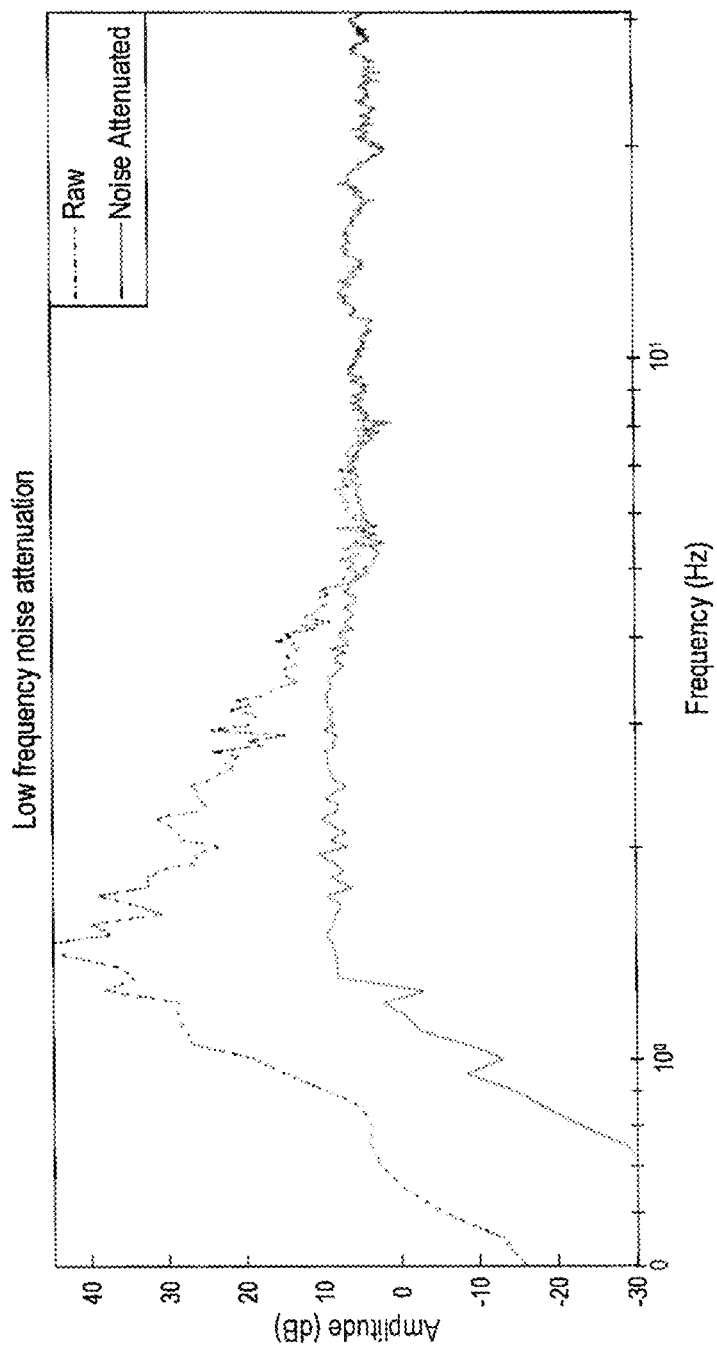

FIG. 16A shows a plot of amplitude versus frequencies for a trace of the raw seismic data before and after low-frequency noise attenuation. FIG. 16B shows a plot of amplitudes versus base-10 log scaled frequencies for the trace of raw seismic data shown FIG. 16A before and after low-frequency noise attenuation. In FIGS. 16A and 16B, dashed curves represent the amplitude variation in the raw seismic data before noise reduction and clearly show increased amplitudes over low-frequencies ranging from about 0-7 Hz. Solid curves in FIGS. 16A and 16B represent the seismic data after noise attenuation and clearly indicate removal of low frequency noise.

FIGS. 17A-17E show gathers of the low-frequency noise attenuated raw seismic data shown in FIG. 14B for different octave bands. FIGS. 17A-17E reveal how processes and systems described herein effectively attenuate low-frequency noise across the different octave bands.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for generating an image of a subterranean formation based on pressure data that were continuously recorded during a geophysical survey, the improvement comprising:
    computing upgoing pressure wavefield data at stationary-receiver locations based on continuously recorded pressure data and vertical velocity data;
    computing a total source wavefield based on source wavefields emitted from individual airguns of a source;
    attenuating low-frequency noise in the upgoing pressure wavefield based on the total source wavefield to obtain low-frequency noise attenuated upgoing pressure wavefield data at stationary-receiver locations; and
    generating an image of the subterranean formation, or data indicative thereof, based at least in part on the low-frequency noise attenuated upgoing pressure wavefield data at stationary-receiver locations, thereby reducing low-frequency noise artifacts in the image.

2. The process of claim 1 further comprising correcting the pressure and vertical velocity data for corresponding pressure and particle motion sensor responses.

3. The process of claim 1 wherein computing the total source wavefield comprises:
    measuring a signal emitted from each airgun of the source when the airguns are activated;
    computing a ghost function that depends on reflectivity of a free surface of the body of water; and
    computing the total source wavefield as a function of the signals emitted from the airguns and the ghost function.

4. The process of claim 1 wherein attenuating the low-frequency noise in the upgoing pressure wavefield to obtain the low-frequency noise attenuated upgoing pressure wavefield data at stationary-receiver locations comprises:
    for each trace of the upgoing pressure wavefield data at stationary-receiver locations:
        deconvolving the total source wavefield from the trace of upgoing pressure wavefield data to obtain an earth response to the total source wavefield;
        extracting low-frequency noise from the earth response;

computing a low-frequency noise contribution to the trace of upgoing pressure wavefield data based on the extracted low-frequency noise and the total source wavefield; and subtracting the low-frequency noise contribution to the trace of upgoing pressure wavefield data from the trace of upgoing pressure wavefield data to obtain a trace of low-frequency noise attenuated upgoing pressure wavefield data.

5. The process of claim 1 wherein attenuating the low-frequency noise in the upgoing pressure wavefield to obtain the low-frequency noise attenuated upgoing pressure wavefield at stationary-receiver locations comprises:

for each trace of the upgoing pressure wavefield data at stationary-receiver locations repeatedly performing the operations comprising:

deconvolving the total source wavefield from the trace of upgoing pressure wavefield data to obtain an earth response to the total source wavefield;

extracting a coherent signal from the earth response;

computing a coherent signal contribution to the upgoing pressure data based on the coherent signal; and subtracting the coherent signal contribution to the upgoing pressure data from the upgoing pressure data to update the upgoing pressure data, until the coherent signal is less than a coherent-signal threshold.

6. A computer system for computing an image of a subterranean formation, the system comprising:

one or more processors;

one or more data-storage devices; and machine-readable instructions stored in the one or more data-storage devices that when executed using the one or more processors controls the system to perform operations comprising:

computing upgoing pressure wavefield data at stationary-receiver locations based on continuously recorded pressure and vertical velocity data obtained during a marine geophysical survey of the subterranean formation;

computing a total source wavefield based on recorded source wavefields emitted from individual airguns that were repeatedly activated during the survey;

attenuating low-frequency noise in the upgoing pressure wavefield based on the total source wavefield to obtain low-frequency noise attenuated upgoing pressure wavefield data at stationary-receiver locations; and generating an image of the subterranean formation, or data indicative thereof, based at least in part on the low-frequency noise attenuated upgoing pressure wavefield data at stationary-receiver locations.

7. The system of claim 6 further comprising correcting the pressure and vertical velocity data for corresponding pressure and particle motion sensor responses.

8. The system of claim 6 wherein computing the total source wavefield comprises:

measuring the signal emitted from each airgun of the source when the airguns are activated;

computing a ghost function that depends on reflectivity of a free surface of the body of water; and computing the total source wavefield as a function of the signals emitted from the airguns and the ghost function.

9. The system of claim 6 wherein attenuating the low-frequency noise in the upgoing pressure wavefield to obtain the low-frequency noise attenuated upgoing pressure wavefield data at stationary-receiver locations comprises:

for each trace of the upgoing pressure wavefield data at stationary-receiver locations, deconvolving the total source wavefield from the trace of upgoing pressure wavefield data to obtain an earth response to the total source wavefield;

extracting low-frequency noise from the earth response;

computing a low-frequency noise contribution to the trace of upgoing pressure wavefield data based on the extracted low-frequency noise and the total source wavefield; and subtracting the low-frequency noise contribution to the trace of upgoing pressure wavefield data from the trace of upgoing pressure wavefield data to obtain a trace of low-frequency noise attenuated upgoing pressure wavefield data.

10. The system of claim 6 wherein attenuating the low-frequency noise in the upgoing pressure wavefield to obtain the low-frequency noise attenuated upgoing pressure wavefield at stationary-receiver locations comprises:

for each trace of the upgoing pressure wavefield data at stationary-receiver locations repeatedly performing the operations comprising:

deconvolving the total source wavefield from the trace of upgoing pressure wavefield data to obtain an earth response to the total source wavefield;

extracting a coherent signal from the earth response;

computing a coherent signal contribution to the upgoing pressure data based on the coherent signal; and subtracting the coherent signal contribution to the upgoing pressure data from the upgoing pressure data to update the upgoing pressure data, until the coherent signal is less than a coherent-signal threshold.

11. A non-transitory computer-readable medium encoded with machine-readable instructions that, when executed by one or more processors of a computer system, perform operations comprising:

computing upgoing pressure wavefield data at stationary-receiver locations based on continuously recorded pressure data and vertical velocity data obtained during a marine geophysical survey of the subterranean formation;

computing a total source wavefield based on source wavefields emitted from individual airguns that were repeatedly activated during the survey;

attenuating low-frequency noise in the upgoing pressure wavefield based on the total source wavefield to obtain low-frequency noise attenuated upgoing pressure wavefield data at stationary-receiver locations; and generating an image of the subterranean formation, or data indicative thereof, based at least in part on the low-frequency noise attenuated upgoing pressure wavefield data at stationary-receiver locations.

12. The medium of claim 11 further comprising correcting the pressure and vertical velocity data for corresponding pressure and particle motion sensor responses.

13. The medium of claim 11 wherein computing the total source wavefield comprises:

measuring the signal emitted from each airgun of the source when the airguns are activated;

computing a ghost function that depends on reflectivity of a free surface of the body of water; and computing the total source wavefield as a function of the signals emitted from the airguns and the ghost function.

14. The medium of claim 11 wherein attenuating the low-frequency noise in the upgoing pressure wavefield to obtain the low-frequency noise attenuated upgoing pressure wavefield data at stationary-receiver locations comprises:

for each trace of the upgoing pressure wavefield data at stationary-receiver locations,
deconvolving the total source wavefield from the trace of upgoing pressure wavefield data to obtain an earth response to the total source wavefield;
extracting low-frequency noise from the earth response;
computing a low-frequency noise contribution to the trace of upgoing pressure wavefield data based on the extracted low-frequency noise and the total source wavefield; and
subtracting the low-frequency noise contribution to the trace of upgoing pressure wavefield data from the trace of upgoing pressure wavefield data to obtain a trace of low-frequency noise attenuated upgoing pressure wavefield data.

15. The medium of claim 11 wherein attenuating the low-frequency noise in the upgoing pressure wavefield to obtain the low-frequency noise attenuated upgoing pressure wavefield at stationary-receiver locations comprises:

for each trace of the upgoing pressure wavefield data at stationary-receiver locations repeatedly performing the operations comprising:
deconvolving the total source wavefield from the trace of upgoing pressure wavefield data to obtain an earth response to the total source wavefield;
extracting a coherent signal from the earth response;
computing a coherent signal contribution to the upgoing pressure data based on the coherent signal; and
subtracting the coherent signal contribution to the upgoing pressure data from the upgoing pressure data to update the upgoing pressure data, until the coherent signal is less than a coherent-signal threshold.

16. Apparatus for generating an image of a subterranean formation based on continuously recorded pressure data and vertical velocity data obtained during a marine geophysical survey of the subterranean formation, the apparatus comprising:

means for computing upgoing pressure wavefield data at stationary-receiver locations based on continuously recorded pressure data and vertical velocity data;
means for computing a total source wavefield based on source wavefields emitted from airguns that were repeatedly activated during the survey;
means for attenuating low-frequency noise in the upgoing pressure wavefield based on the total source wavefield to obtain low-frequency noise attenuated upgoing pressure wavefield data at stationary-receiver locations; and
means for generating an image of the subterranean formation, or data indicative thereof, based at least in part on the low-frequency noise attenuated upgoing pressure wavefield data at stationary-receiver locations.

17. The apparatus of claim 16 further comprising means for correcting the pressure and vertical velocity data for corresponding pressure and particle motion sensor responses.

18. The apparatus of claim 16 wherein the means for computing the total source wavefield comprises:
means for measuring the signal emitted from each airgun of the source when the airguns are activated;
means for computing a ghost function that depends on reflectivity of a free surface of the body of water; and
means for computing the total source wavefield as a function of the signals emitted from the airguns and the ghost function.

19. The apparatus of claim 16 wherein the means for attenuating the low-frequency noise in the upgoing pressure wavefield to obtain the low-frequency noise attenuated upgoing pressure wavefield data at stationary-receiver locations comprises:

for each trace of the upgoing pressure wavefield data at stationary-receiver locations,
deconvolves the total source wavefield from the trace of upgoing pressure wavefield data to obtain an earth response to the total source wavefield;
extracts low-frequency noise from the earth response;
computes a low-frequency noise contribution to the trace of upgoing pressure wavefield data based on the extracted low-frequency noise and the total source wavefield; and
subtracts the low-frequency noise contribution to the trace of upgoing pressure wavefield data from the trace of upgoing pressure wavefield data to obtain a trace of low-frequency noise attenuated upgoing pressure wavefield data.

20. The apparatus of claim 16 wherein the means for attenuating the low-frequency noise in the upgoing pressure wavefield to obtain the low-frequency noise attenuated upgoing pressure wavefield at stationary-receiver locations comprises:

for each trace of the upgoing pressure wavefield data at stationary-receiver locations repeatedly performing the operations comprising:
deconvolves the total source wavefield from the trace of upgoing pressure wavefield data to obtain an earth response to the total source wavefield;
extracts a coherent signal from the earth response;
computes a coherent signal contribution to the upgoing pressure data based on the coherent signal; and
subtracts the coherent signal contribution to the upgoing pressure data from the upgoing pressure data to update the upgoing pressure data, until the coherent signal is less than a coherent-signal threshold.

21. A method for manufacturing a geophysical data product, the method comprising:

computing upgoing pressure wavefield data at stationary-receiver locations based on continuously recorded pressure data and vertical velocity data obtained during a marine geophysical survey of a subterranean formation;
computing a total source wavefield based on source wavefields emitted from individual airguns that were repeatedly activated during the survey;
attenuating low-frequency noise in the upgoing pressure wavefield based on the total source wavefield to obtain low-frequency noise attenuated upgoing pressure wavefield data at stationary-receiver locations;
generating an image of the subterranean formation, or data indicative there, based at least in part on the low-frequency noise attenuated upgoing pressure wavefield data at stationary-receiver locations; and
storing the image in a non-transitory computer-readable medium.

* * * * *